United States Patent
Masaoka et al.

(10) Patent No.: US 8,072,511 B2
(45) Date of Patent: Dec. 6, 2011

(54) NOISE REDUCTION PROCESSING APPARATUS, NOISE REDUCTION PROCESSING METHOD, AND IMAGE SENSING APPARATUS

(75) Inventors: Kengo Masaoka, Higashiosaka (JP); Satoru Takeuti, Nagareyama (JP); Seiji Okada, Hirakata (JP)

(73) Assignee: SANYO Electric Co., Ltd., Moriguchi (JP)

( * ) Notice: Subject to any disclaimer, the term of this patent is extended or adjusted under 35 U.S.C. 154(b) by 649 days.

(21) Appl. No.: 12/289,029

(22) Filed: Oct. 17, 2008

(65) Prior Publication Data
US 2009/0273717 A1  Nov. 5, 2009

(30) Foreign Application Priority Data
Oct. 18, 2007  (JP) .................. 2007-271646

(51) Int. Cl.
*H04N 5/217*  (2006.01)
*H04N 9/64*  (2006.01)

(52) U.S. Cl. ....................................... 348/241; 348/252

(58) Field of Classification Search .................. 348/241, 348/252, 240.99, 208.99, 208.4–208.6, 208.13; 375/240, 240.1
See application file for complete search history.

(56) References Cited

U.S. PATENT DOCUMENTS

| 6,400,762 B2 * | 6/2002 | Takeshima ............... 375/240.01 |
| 7,898,581 B2 * | 3/2011 | Tanizoe ....................... 348/241 |
| 2011/0080503 A1 * | 4/2011 | Okada et al. .................. 348/234 |

FOREIGN PATENT DOCUMENTS
JP  2003-18470 A  1/2003
* cited by examiner

*Primary Examiner* — Mohammed Hasan
(74) *Attorney, Agent, or Firm* — NDQM & Watchstone LLP

(57) ABSTRACT

An image signal subjected to three-dimensional noise reduction processing in a three-dimensional noise reduction processing portion is reduced by an electronic zoom portion, and is stored as a low-resolution image in a frame memory. The image signal stored in the frame memory is enlarged by an electronic zoom portion, and is fed to a three-dimensional noise reduction processing portion; it is then converted into an image signal having the same resolution as an image signal of a high-resolution image inputted from outside.

14 Claims, 16 Drawing Sheets

| GR1 | R1 | GR2 | R2 | GR3 | R3 | GR4 | R4 |
|---|---|---|---|---|---|---|---|
| B1 | GB1 | B2 | GB2 | B3 | GB3 | B4 | GB4 |
| GR5 | R5 | GR6 | R6 | GR7 | R7 | GR8 | R8 |
| B5 | GB5 | B6 | GB6 | B7 | GB7 | B8 | GB8 |

| GR1a | R1a | GR2a | R2a |
|---|---|---|---|
| B1a | GB1a | B2a | GB2a |

Fig.9
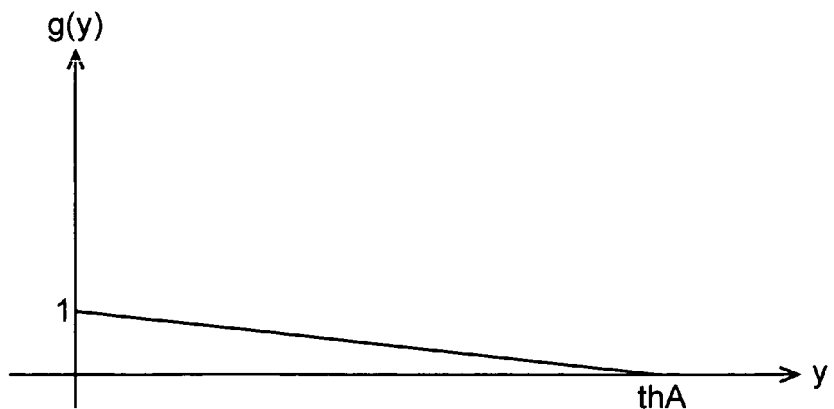
Fig.10
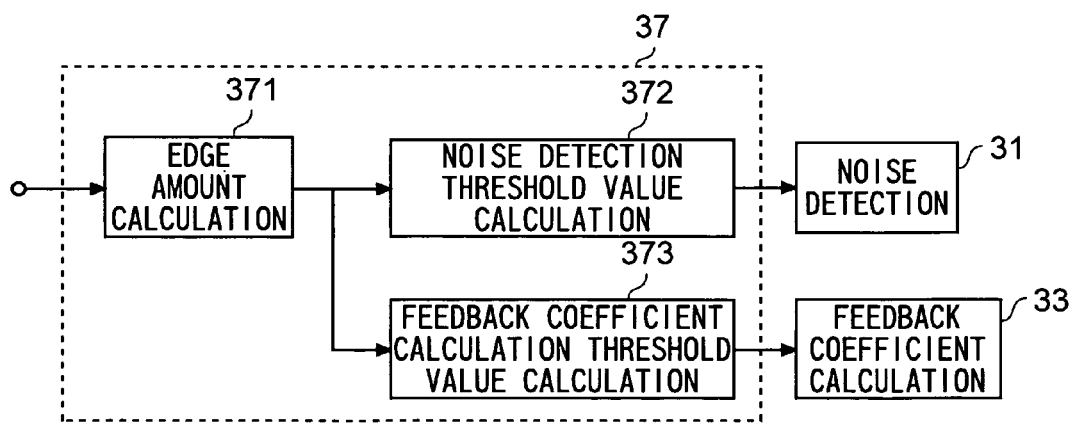
Fig.11
| X1 | X2 | X3 |
|----|----|----|
| X4 | X5 | X6 |
| X7 | X8 | X9 |

NOISE REDUCTION PROCESSING APPARATUS, NOISE REDUCTION PROCESSING METHOD, AND IMAGE SENSING APPARATUS

This application is based on Japanese Patent Application No. 2007-271646 filed on Oct. 18, 2007, the contents of which are hereby incorporated by reference.

BACKGROUND OF THE INVENTION

1. Field of the Invention

The present invention relates to a noise reduction processing apparatus and a noise reduction processing method for reducing noise in a moving image composed of a plurality of frames, and more particularly to a noise reduction processing apparatus and a noise reduction processing method involving three-dimensional noise reduction processing in which noise is detected across a plurality of temporally consecutive frames. The present invention also relates to an image sensing apparatus provided with such a noise reduction processing apparatus.

2. Description of Related Art

In recent years, with the development of various digital technologies, image sensing apparatuses, such as digital cameras and digital video recorders, that shoot digital images with a solid-state image sensing device such as a CCD (charge-coupled device) or CMOS (complimentary metal oxide semiconductor) sensor and display apparatuses, such as liquid crystal displays and plasma televisions, that display digital images have been becoming increasingly widespread. To reduce noise in a moving image composed of a plurality of frames in such image sensing apparatuses and display apparatuses, various noise reduction technologies have been proposed.

One of such noise reduction technologies is two-dimensional noise reduction processing, in which noise reduction is performed within a single-frame image. In two-dimensional noise reduction processing, a single-frame image is processed with a spatial low-pass filter so that the pixel values of a pixel of interest and of surrounding pixels are smoothed and thereby noise in the target frame is reduced. Since this two-dimensional noise reduction processing is noise reduction processing within a single frame, it has the disadvantage of susceptibility to the pixel values of surrounding pixels, resulting in a blurred image. Instead, the signals of two temporally consecutive frames may be added up so that those frames are processed with a temporal low-pass filter thereby to reduce noise. This is three-dimensional noise reduction processing, another known noise reduction technology.

The configuration of a conventional three-dimensional noise reduction processing apparatus that performs such three-dimensional noise reduction processing is shown in FIG. 22. As shown in FIG. 22, the conventional three-dimensional noise reduction processing apparatus comprises: a noise detecting portion 31 that detects noise by comparing the image signal of the current frame acquired by a solid-state image sensing device with the image signal of the preceding frame; a motion detecting portion 32 that detects a motion amount by comparing the image signals of two frames, namely the current and preceding frames; a feedback coefficient calculation portion 33 that sets a feedback coefficient based on the motion amount detected by the motion detecting portion 32; a multiplication portion 34 that multiples the noise acquired by the noise detecting portion 31 by the feedback coefficient from the feedback coefficient calculation portion 33; a subtraction portion 35 that subtracts the noise acquired by the multiplication portion 34 from the image signal of the current frame acquired by the solid-state image sensing device; and a frame memory 36 that temporarily stores the one-frame-worth image signal that has undergone noise elimination by the subtraction portion 35.

In the conventional three-dimensional noise reduction processing apparatus configured as described above, when the image signal that will form the current frame is inputted, the noise detecting portion 31 calculates the difference between it and the image signal of the preceding frame stored in the frame memory 36, and detects the amount of noise based on the difference. Moreover, the motion amount detecting portion 32 detects the amount of subject motion between the image signals of the current and preceding frames. Then the feedback coefficient calculation portion 33 calculates a feedback coefficient such that the greater the motion amount the smaller the feedback coefficient, and feeds it to the multiplication portion 34.

Thus the multiplication portion 34 multiplies the noise acquired by the noise detecting portion 31 by the feedback coefficient calculated by the feedback coefficient calculation portion 33, thereby calculates the true noise recognized between the current and preceding frames, and feeds it to the subtraction portion 35. Thus the subtraction portion 35 subtracts the noise calculated by the multiplication portion 34 from the image signal of the current frame, and thereby outputs a noise-reduced image signal of the current frame. The image signal of the current frame thus noise-reduced is outputted to the stage succeeding the three-dimensional noise reduction processing apparatus, and is also fed to the frame memory 36 so as to be temporarily stored there for noise reduction of the image signal of the next frame.

Some proposed image sensing apparatuses that perform three-dimensional noise reduction processing as described above perform both still image shooting and moving image shooting and in addition are capable of efficient noise reduction in still image shooting. In these image sensing apparatuses, three-dimensional noise reduction as described above is performed on RGB signals before matrixing for generating luminance and color-difference signals. When the RGB signals having undergone three-dimensional noise reduction processing are then subjected to matrixing, the luminance signal is assigned a greater number of pixels in still image shooting than in moving image shooting to acquire a high-quality, high-definition image.

Disadvantageously, however, in the three-dimensional noise reduction processing shown in FIG. 22 and the three-dimensional noise reduction processing in the image sensing apparatuses described above, an image signal of the same resolution as the image signal of the processing target frame (current frame) is necessary as the image signal of the preceding frame for processing. Specifically, to store the image signal acquired from the solid-state image sensing device in the frame memory, the frame memory needs to have an amount of memory corresponding to the number of pixels of the solid-state image sensing device.

Thus, in the conventional three-dimensional noise reduction processing apparatus, using a solid-state image sensing device of high resolution with a view to acquiring an image signal that will form a high-resolution image requires that the image signal of the preceding frame stored in the frame memory needs to be of high resolution with a large amount of data. This not only increases the memory capacity of the frame memory for storing the image signal of the preceding frame but also increases the amount of data transferred between the frame memory and different blocks in the three-dimensional noise reduction processing apparatus. This increases the size of the apparatus, and in addition increases the power consumption in three-dimensional noise reduction processing.

SUMMARY OF THE INVENTION

According to one aspect of the present invention, a noise reduction processing apparatus comprises: a three-dimensional noise reduction processing portion comprising—a noise detection portion that, by using the image signals of a plurality of frames acquired at different times, detects, for each pixel, the noise amount in a first image signal taken as an input frame, and a calculation portion that performs noise reduction by subtracting the noise amount detected by the noise detection portion from the first image signal and outputs the resulting signal as a second image signal taken as an output frame; a first electronic zoom portion that performs resolution diminution processing on the second image signal outputted from the three-dimensional noise reduction processing portion to generate and output a low-resolution image signal; a frame memory that stores the low-resolution image signal, based on the second image signal, outputted from the first electronic zoom portion; and a second electronic zoom portion that performs resolution augmentation processing on the second image signal stored as the low-resolution image signal in the frame memory to output the resulting signal as the second image signal as acquired in the past to the three-dimensional noise reduction processing portion. Here, the three-dimensional noise reduction processing portion performs three-dimensional noise reduction processing on the first image signal based on the first image signal taken as the input frame and the second image signal fed from the second electronic zoom portion.

According to another aspect of the present invention, an image sensing apparatus comprises the noise reduction processing apparatus described above. Here, the noise reduction processing apparatus is fed with the image signals of a plurality of frames-worth shot images, and noise in the first image signal taken as the input frame is reduced based on the image signals of a plurality of frames including the input frame.

According to another aspect of the present invention, a noise reduction processing apparatus comprises: a three-dimensional noise reduction processing portion comprising—a noise detection portion that, by using the image signals of a plurality of frames acquired at different times, detects, for each pixel, the noise amount in a first image signal taken as an input frame, and a calculation portion that performs noise reduction by subtracting the noise amount detected by the noise detection portion from the first image signal and outputs the resulting signal as a second image signal taken as an output frame; a first electronic zoom portion that performs resolution diminution processing on the first image signal and outputs the first image signal as a low-resolution image signal to the three-dimensional noise reduction processing portion; a frame memory that stores, intact as the low-resolution image signal, the second image signal outputted from the three-dimensional noise reduction processing portion and outputs the stored second image signal as the second image signal as acquired in the past to the three-dimensional noise reduction processing portion; a second electronic zoom portion that performs resolution augmentation processing on the second image signal outputted as the low-resolution image signal from the three-dimensional noise reduction processing portion and outputs the resulting signal as the image signal of the current frame after noise reduction. Here, the three-dimensional noise reduction processing on the first image signal based on the first image signal fed from the first electronic zoom portion and the second image signal fed from the frame memory.

According to another aspect of the present invention, an image sensing apparatus comprises the noise reduction processing apparatus described above. Here, the noise reduction processing apparatus is fed with the image signals of a plurality of frames-worth shot images, and noise in the first image signal taken as the input frame is reduced based on the image signals of a plurality of frames including the input frame.

According to another aspect of the present invention, a noise reduction processing method comprises: a noise detection step of, by using the image signals of a plurality of frames acquired at different times, detecting, for each pixel, the noise amount in a first image signal taken as an input frame; a calculation step of performing noise reduction by subtracting the noise amount detected in the noise detection step from the first image signal, and then outputting the resulting signal as a second image signal taken as an output frame; a resolution diminution step of performing resolution diminution processing on the second image signal obtained in the calculation step to generate and output a low-resolution image signal; a storage step of storing in a frame memory the low-resolution image signal, based on the second image signal, obtained in the resolution diminution step; and a resolution augmentation step of performing resolution augmentation processing on the second image signal stored as the low-resolution image signal in the frame memory, and then outputting the resulting signal as the second image signal as acquired in the past. Here, in the noise detection step and the calculation step, three-dimensional noise reduction processing is performed with the first and second image signals converted into image signals with the same resolution as the input frame.

According to another aspect of the present invention, a noise reduction processing method comprises: a noise detection step of, by using the image signals of a plurality of frames acquired at different times, detecting, for each pixel, the noise amount in a first image signal taken as an input frame; a calculation step of performing noise reduction by subtracting the noise amount detected in the noise detection step from the first image signal, and then outputting the resulting signal as a second image signal taken as an output frame; a resolution diminution step of performing resolution diminution processing on the first image signal to convert the first image signal into a low-resolution image signal; a storage step of storing, in a frame memory, the second image signal obtained as the noise-reduced low-resolution image signal in the calculation step; and a resolution augmentation step of performing resolution augmentation processing on the second image signal obtained as the noise-reduced low-resolution image signal in the calculation step, and then outputting the resulting signal as an image signal with the same resolution as the input frame. Here, in the noise detection step and the calculation step, three-dimensional noise reduction processing is performed with the first and second image signals converted into low-resolution image signals.

BRIEF DESCRIPTION OF THE DRAWINGS

FIG. 9 is a graph showing the function g(y) used in feedback coefficient calculation operation;

FIG. 10 is a block diagram showing the configuration of an edge amount detecting portion provided in the noise reduction processing portion shown in FIG. 5;

FIG. 11 is a diagram showing the relationship between a pixel of interest and surrounding pixels;

DETAILED DESCRIPTION OF PREFERRED EMBODIMENTS

Embodiments of the present invention will be described below with reference to the accompanying drawings. The following description takes up, as an example, an image sensing apparatus, such as a digital camera or a digital video recorder, provided with an image processing apparatus (in the following description, provided in an "image processing portion") according to the present invention.

Configuration of Image Sensing Apparatus

Figure 1:
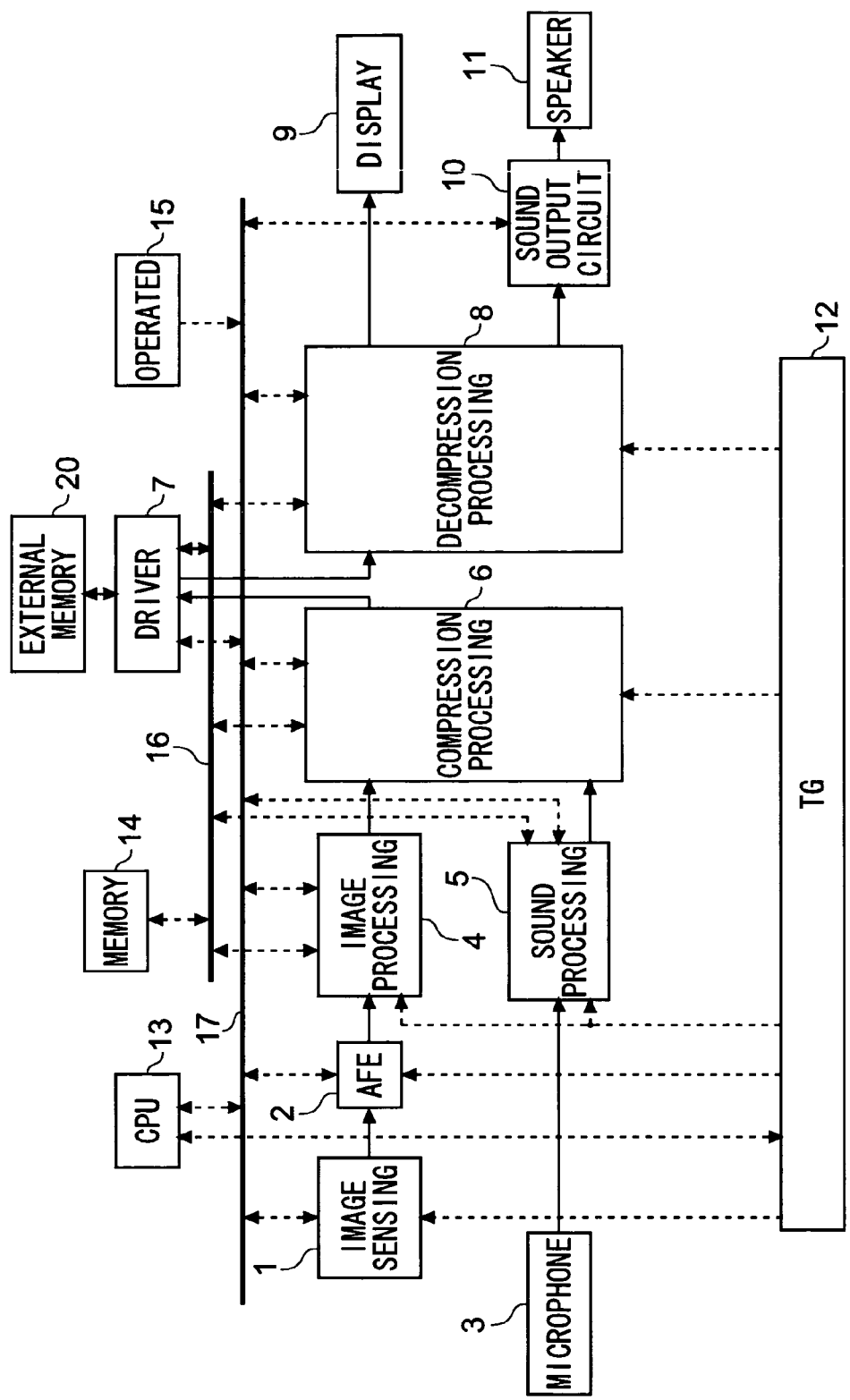
FIG. 1 is a block diagram showing the internal configuration of an image sensing apparatus provided with a noise reduction processing portion as a noise reduction processing apparatus according to the invention.

First, the internal configuration of an image sensing apparatus will be described with reference to the relevant drawings. FIG. 1 is a block diagram showing the internal configuration of an image sensing apparatus.

The image sensing apparatus shown in FIG. 1 comprises: an image sensing portion 1 that outputs an image signal in the form of an analog signal; an AFE (analog front end) 2 that converts the image signal in the form of an analog signal outputted from the image sensing portion 1 into a digital signal; a microphone 3 that converts sounds inputted from outside into an electrical signal; an image processing portion 4 that performs various kinds of image processing, including noise reduction processing, on the image signal in the form of a digital signal from the AFE 2; a sound processing portion 5 that converts the sound signal in the form of an analog signal from the microphone 3 into a digital signal; a compression processing portion 6 that performs compression/encoding processing, such as by an MPEG (Moving Picture Experts Group) compression method, on the image signal from the image processing portion 4 and the sound signal from the sound processing portion 5; a driver portion 7 that records the compressed/encoded signal compressed/encoded by the compression processing portion 6 in an external memory 20; a decompression processing portion 8 that decompresses and thereby decodes the compressed/encoded signal read out from the external memory 20 by the driver portion 7; a display 9 that displays an image based on the image signal obtained through decoding by the decompression processing portion 8; a sound output circuit portion 10 that converts the sound signal from the decompression processing portion 8 into an analog signal; a speaker 11 that reproduces and outputs sounds based on the sound signal from the sound output circuit portion 10; a TG (timing generator) 12 that outputs timing control signals for synchronizing the operation of different blocks; a CPU (central processing unit) 13 that controls the overall operation within the image sensing apparatus; a memory 14 that stores programs for different operations and that temporarily stores data during execution of programs; an operated portion 15 via which a user inputs commands; a bus network 16 across which data is exchanged between the memory 14 and different blocks; and a bus network 17 across which data is exchanged between the CPU 13 and different blocks.

(1) Moving Image Shooting Operation

In this image sensing apparatus, when moving image shooting operation is requested via the operated portion 15, an image signal in the form of an analog signal obtained through photoelectric conversion operation by an image sensor within the image sensing portion 1 is outputted to the AFE 2. Here, fed with a timing control signal from the timing generator 12, the image sensor within the image sensing portion 1 performs horizontal and vertical scanning to output the image signal, which contains pixel-by-pixel data. The AFE 2 then converts the image signal in the form of an analog signal into a digital signal, which is then fed to the image processing portion 4, where the signal is subjected to various kinds of image processing, including signal conversion processing for generating luminance and color-difference signals.

When digital zooming is requested via the operated portion 15 to augment the resolution of the image signal obtained from the image sensing portion 1, noise reduction processing is performed based on a plurality of frames-worth image signals from the image sensing portion 1. Then, based on the image signals having undergone noise reduction processing, luminance and color-difference signals are generated. Moreover, for the purpose of noise reduction processing, motion amounts among the image signals of the plurality of frames are calculated, and based on those motion amounts, position adjustment is performed among the frames.

The image signal having undergone image processing by the image processing portion 4 is fed to the compression processing portion 6. Here, a sound signal in the form of an analog signal obtained as a result of sound input to the microphone 3 is converted by the sound processing portion 5 into a digital signal, which is then fed to the compression processing portion 6. Thus the compression processing portion 6 compresses/encodes the image signal and the sound signal in the form of digital signals according to an MPEG compression/encoding method, and feeds the results to the driver portion 7 to make it record them in the external memory 20. Moreover, here, the compressed signals recorded in the external memory 20 are read out by the driver portion 7 and fed to the decompression processing portion 8, where the signals are subjected to decompression processing to obtain an image signal. This image signal is fed to the display portion 9, which thus displays the subject image as currently being shot via the image sensing portion 1.

(2) Still Image Shooting Operation

When still image shooting is requested, as distinct from when moving image shooting is requested, no sound is obtained from the microphone 3, and a compressed signal containing an image signal alone is obtained by a compression/encoding method such as a JPEG (Joint Photographic Experts Group) compression/encoding method in the compression processing portion 6, and is then recorded in the external memory 20. In other respects, the basic operations here are the same as in moving image shooting. In still image shooting, not only is the compressed signal corresponding to the still image shot in response to a request entered via the operated portion 15 recorded in the external memory 20, also a compressed signal corresponding to the image as currently being shot by the image sensing portion 1 is temporarily recorded as a through image in the external memory 20.

Thus the compressed signal corresponding to the image as currently being shot is decompressed by the decompression processing portion 8, so that the image as currently being shot by the image sensing portion 1 is displayed on the display portion 9, and thus the user can confirm it. In this way, before shutter-release operation is requested via the operated portion 15 to shoot a still image, an image signal that forms a through image to be displayed on the display portion 9 is acquired. The image signal forming this through image is of lower resolution compared with the image signal of the still image acquired after shutter-release operation.

Figures 2A, 2B, 2C:
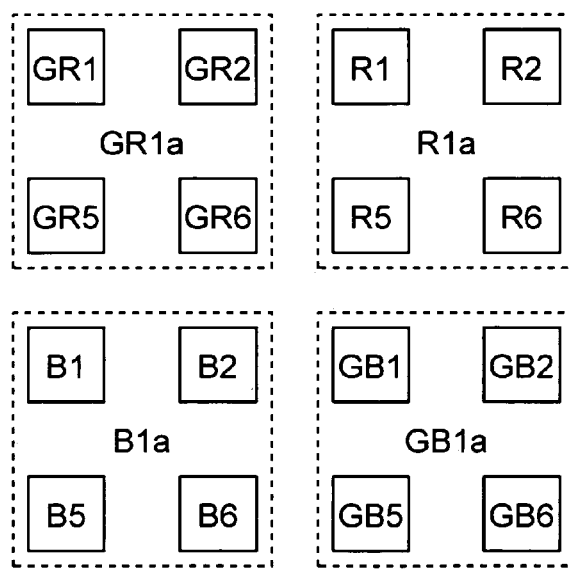
FIG. 2A is a diagram showing an array of RGB primary color filters.
FIG. 2B is a diagram showing a method for summation averaging of pixels.
FIG. 2C is a diagram showing pixels after summation averaging.

The reason that the image signal forming the through image is of lower resolution than the image signal of the still image acquired after shutter-release operation is that the former is obtained through summation averaging of image signals acquired by the image sensor within the image sensing portion 1. How the image signal forming the through image is generated will now be described in brief with reference to FIGS. 2A to 2C. As shown in FIG. 2A, the image sensor within the image sensing portion 1 is provided with RGB primary color filters, and thus outputs an image signal of RGB primary colors to the AFE 2. The RGB primary color filters provided in the image sensor within the image sensing portion 1 are so arranged that, of every four pixels consisting of horizontally two by vertically two pixels, two on a diagonal line are provided with G filters and the remaining two are provided with a R and a B filter respectively.

An array of RGB primary color filters provided for vertically four by horizontally eight pixels is shown in FIG. 2A. In the first row, pixels GR1 to GR4 provided with G filters and pixels R1 to R4 provided with R filters are arranged alternately in the horizontal direction; in the second row, pixels B1 to B4 provided with B filters and pixels GB1 to GB4 provided with G filters are arranged alternately in the horizontal direction; in the third row, pixels GR5 to GR8 provided with G filters and pixels R5 to R8 provided with R filters are arranged alternately in the horizontal direction; and in the fourth row, pixels B5 to B8 provided with B filters and pixels GB5 to GB8 provided with G filters are arranged alternately in the horizontal direction.

When the image sensor within the image sensing portion 1 has its pixels arranged with an array of RGB primary color filters as shown in FIG. 2A, in the image signal that forms the through image, the image signals of pixels provided with filters of the same color are averaged for every horizontally two by vertically two such pixels. Specifically, as shown in FIG. 2B, the pixel values of the four pixels GR1, GR2, GR5, and GR6 are summation-averaged to calculate the pixel value of a pixel GR1$a$ in the through image; the pixel values of the four pixels GB1, GB2, GB5, and GB6 are summation-averaged to calculate the pixel value of a pixel GB1$a$ in the through image; the pixel values of the four pixels R1, R2, R5, and R6 are summation-averaged to calculate the pixel value of a pixel R1$a$ in the through image; and the pixel values of the four pixels B1, B2, B5, and B6 are summation-averaged to calculate the pixel value of a pixel B1$a$ in the through image.

Through summation averaging of every four pixels provided with filters of the same color as shown in FIG. 2B, an image signal of four by eight pixels as shown in FIG. 2A is converted to an image signal of two by four pixels forming the through image as shown in FIG. 2C. As a result, in the through image shown in FIG. 2C, as a result of summation averaging of every four pixels corresponding to image signals of the same color, in the first row, pixels GR1$a$ and GR2$a$ corresponding to G signals and pixels R1$a$ and R2$a$ corresponding to R signals are arranged alternately; and in the second row, pixels B1$a$ and B2$a$ corresponding to B signals and pixels GB1$a$ and GB2$a$ corresponding to G signals are arranged alternately.

While the display portion 9 is displaying a low-resolution image as the through image in this way, the summation averaging mentioned above may be performed on the image signal as having converted into a digital signal by the AFE 2, or may be performed directly on the image signal as outputted from the image sensor within the image sensing portion 1. When shutter-release operation is requested via the operated portion 15, the summation averaging for generating the through image is stopped, and an image signal of an image of the same high resolution as the resolution of the image sensor within the image sensing portion 1 is fed to the image processing portion 4. Thus the driver portion 7 records the image signal of the high resolution image as a still image in the external memory 20.

As described above, when shooting operation for a still or moving image is performed, the timing generator 12 feeds timing control signals to the AFE 2, the image processing portion 4, the sound processing portion 5, the compression processing portion 6, and the decompression processing portion 8, so that these operate in synchronism with the frame-by-frame shooting operation by the image sensor within the image sensing portion 1. In still image shooting, in response to a request for shutter-release operation entered via the operated portion 15, the timing generator 12 feeds timing control signals to the image sensing portion 1, the AFE 2, the image processing portion 4, and the compression processing portion 6, so that different blocks operate in synchronism (3) Playback of a Moving or Still Image When playback of a moving or still image recorded in the external memory 20 is requested via the operated portion 15, the compressed signal recorded in the external memory 20 is read out by the driver portion 7 and is fed to the decompression processing portion 8. In the case of a moving image, the signal is then decompressed/decoded according to an MPEG compression/encoding method in the decompression processing portion 8, and thus an image signal and a sound signal are obtained. The image signal is then fed to the display portion 9 to play back an image, and the sound signal is fed via the sound output circuit portion 10 to the speaker 11 to play back sounds. In this way, both a moving image and sounds based on the compressed signal recorded in the external memory 20 are played back.

In the case of a still image, the compressed signal is decompressed/decoded according to a JPEG compression/encoding method in the decompression processing portion 8, and thus an image signal is obtained. The image signal is then fed to the display portion 9 to play back an image. In this way, a still image based on the compressed signal recorded in the external memory 20 is played back.

(4) Electronic Zoom Processing

In the image sensing apparatus configured as shown in FIG. 1, the different embodiments described later are each characterized by a distinctive procedure for the noise reduction processing in the image processing portion 4. The noise reduction processing described in each embodiment later is performed by the image processing portion 4, which performs electronic zoom processing to convert, by calculation, the angle of view of the image signal obtained from the AFE 2. A description will now be given of this electronic zoom processing, which is common to all the embodiments described later.

Figure 3:
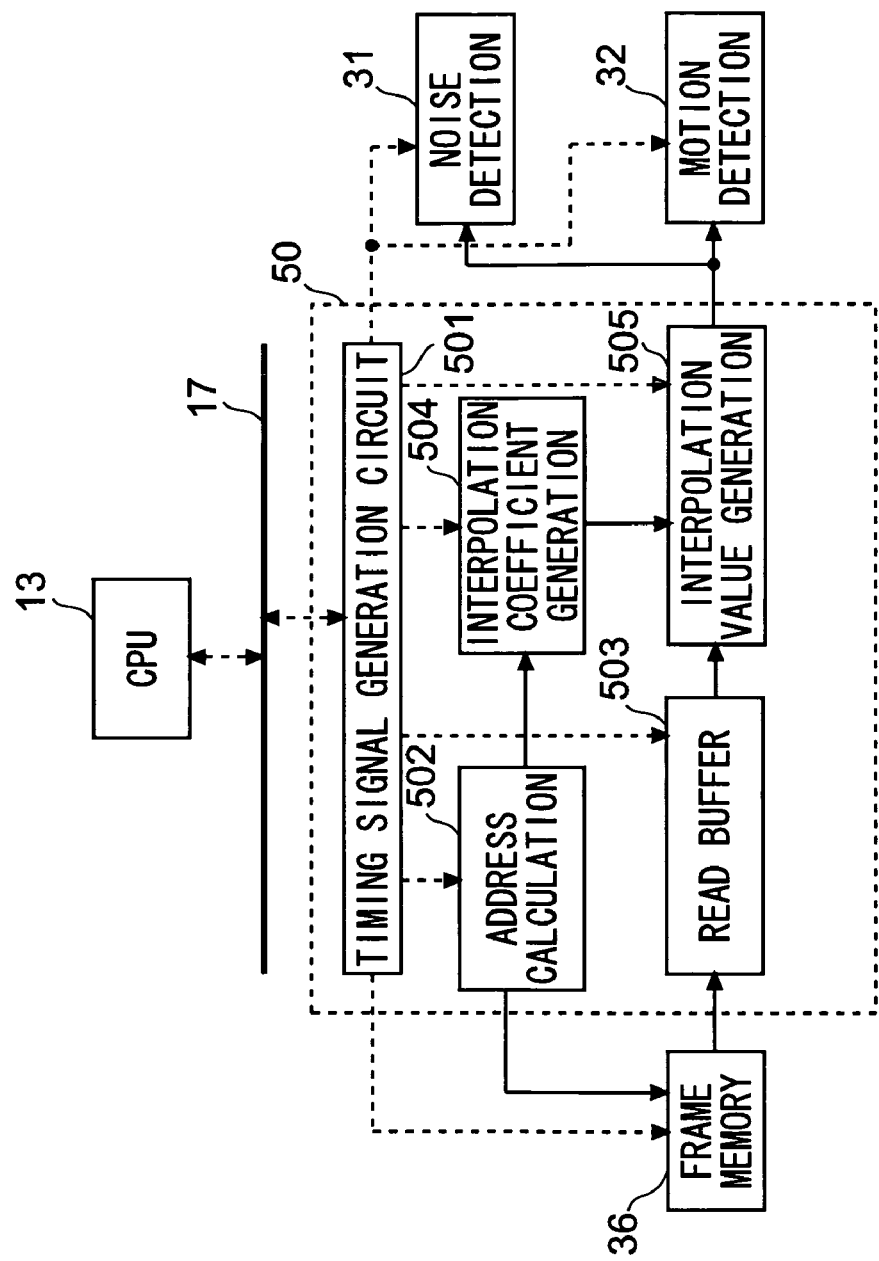
FIG. 3 is a block diagram showing an example of the configuration of an electronic zoom portion.

Within the image processing portion 4, electronic zoom processing is performed by an electronic zoom portion 50. As shown in FIG. 3, the electronic zoom portion 50 comprises: a timing signal generation circuit 501 that receives signals via the bus 17 from the CPU 13 and outputs control signals to different blocks; an address calculation portion 502 that calculates the address value for reading out, from the frame memory 36, an image signal to be targeted by electronic zoom processing; a read buffer 503 that temporarily stores the image signal read out from the frame memory 36; an interpolation coefficient generation portion 504 that generates an interpolation coefficient for the image signal to be targeted by electronic zoom processing; and an interpolation value generation portion 505 that calculates, based on the interpolation coefficient generated by the interpolation coefficient generation portion 504, an interpolation value for the image signal temporarily stored in the read buffer 503.

An outline of the operation of electronic zoom processing performed by the electronic zoom portion 50 configured as shown in FIG. 3 will now be described. On the signal inputted from the frame memory 36, the electronic zoom portion 50 performs electronic zoom processing based on a zoom magnification α and center coordinates (Xc, Yc) inputted via the bus 17 from the CPU 13, and outputs the resulting electronically zoomed signal to the noise detection portion 31 and to the motion detection portion 32.

Specifically, in the electronic zoom portion 50, first, a zoom magnification α and center coordinates (Xc, Yc) are inputted from the CPU 13 via the bus 17 to the timing signal generation circuit 501. Then the timing signal generation circuit 501 outputs an instruction to the address calculation portion 502 to make it calculate the signal value at each pair of coordinates (x, y) after electronic zoom processing. Thus, from the coordinates (x, y), the zoom magnification α, and the center coordinates (Xc, Yc), the address calculation portion 502 calculates (Xad, Yad) according to formula (1) below.

$$Xad = Xc \times \left(1 - \frac{1}{\alpha}\right) + \frac{x}{\alpha} \quad (1)$$

$$Yad = Yc \times \left(1 - \frac{1}{\alpha}\right) + \frac{y}{\alpha}$$

Then the address calculation portion 502 calculates the addresses in the frame memory 36 where the signal values at ([Xad], [Yad]), ([Xad+1], [Yad]), ([Xad], [Yad+1]), and ([Xad+1], [Yad+1]) respectively are stored, and outputs the values representing these addresses to the frame memory 36; it moreover outputs the values of Xad and Yad to the interpolation coefficient generation portion 504. Here, brackets "[ ]" are the Gauss symbol.

When fed with the values representing the addresses calculated by the address calculation portion 502, the frame memory 36 outputs to the read buffer 503 the signal values that are the pixel values at ([Xad], [Yad]), ([Xad+1], [Yad]), ([Xad], [Yad+1]), and ([Xad+1], [Yad+1]) respectively in the frame stored. The read buffer 503 temporarily stores the signal values at ([Xad], [Yad]), ([Xad+1], [Yad]), ([Xad], [Yad+1]), and ([Xad+1], [Yad+1]) respectively thus read out from the frame memory 36.

On the other hand, when fed with the addresses Xad and Yad calculated by the address calculation portion 502, the interpolation coefficient generation portion 504 calculates, for example by a linear interpolation method, the weight coefficients for the signal values at the coordinates ([Xad], [Yad]), ([Xad+1], [Yad]), ([Xad], [Yad+1]), and ([Xad+1], [Yad+1]) respectively. The interpolation value generation portion 505 then performs, using the weight coefficients inputted form the interpolation coefficient generation portion 504, weighted addition on the signal values that are the pixel values at the coordinates ([Xad], [Yad]), ([Xad+1], [Yad]), ([Xad], [Yad+1]), and ([Xad+1], [Yad+1]) respectively, and outputs the signal value that is the pixel value at the thus obtained coordinates (x, y) after electronic zoom processing.

Figure 4A:
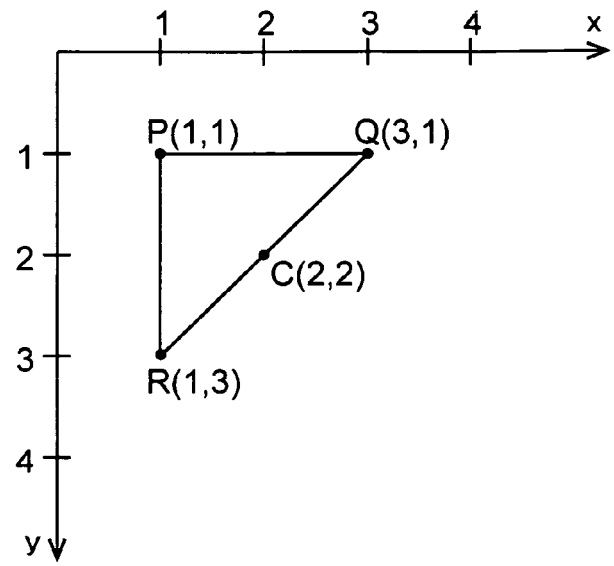
FIG. 4A is a diagram illustrating the operation of the electronic zoom portion configured as shown in FIG. 3, showing pixels before electronic zooming.
Figure 4B:
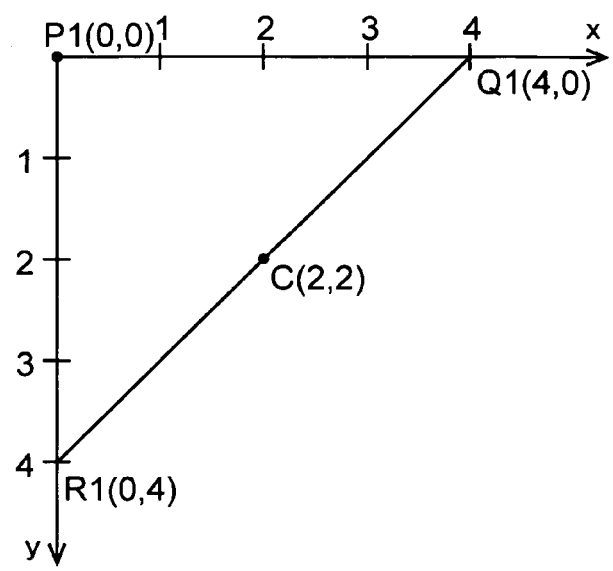
FIG. 4B is a diagram illustrating the operation of the electronic zoom portion configured as shown in FIG. 3, showing pixels after electronic zooming.

Next, an example of the operation of the electronic zoom portion 50 will be described with reference to FIGS. 4A and 4B. In FIG. 4A, a triangle PQR corresponding to an image signal inputted to the electronic zoom portion 50 is plotted on an x-y coordinate system; in FIG. 4B, a triangle P1Q1R1 corresponding to the image signal after electronic zoom processing of the image of FIG. 4A by the electronic zoom portion 50, at a magnification α=2 and with center coordinates (Xc,Yc)=(2, 2), is plotted on the x-y coordinate system. Here, the coordinates of point P is (1, 1), the coordinates of point Q is (3, 1), the coordinates of point R is (1, 3), the coordinates of point P1 is (0, 0), the coordinates of point Q1 is (4, 0), and the coordinates of point R1 is (0, 4).

Here, electronic zoom processing is performed according to formula (1) above. Specifically, with α=2 and (Xc,Yc)=(2, 2) substituted in formula (1), substituting the coordinates (0, 0) of point P1 as (x, y) makes the result (Xad, Yad) equal to (1, 1), which corresponds to the coordinates of point P; substituting the coordinates (4, 0) of point Q1 as (x, y) makes the result (Xad, Yad) equal to (3, 1), which corresponds to the coordinates of point Q; and substituting the coordinates (0, 4) of point R1 as (x, y) makes the result (Xad, Yad) equal to (1, 3), which corresponds to the coordinates of point R.

In each embodiment described below, it is assumed that the electronic zoom portion 50 operating as described above is configured so as to perform noise reduction processing; the electronic zoom portion 50 may instead be provided for the purpose of supplementing the magnification of optical zoom. This helps avoid making the optical system complex and bulky in cases where high-magnification shooting is performed with optical zoom. Specifically, in cases where the image sensing portion 1 is provided with a focus lens and a zoom lens for optical zoom and the desired magnification is so high that the distance between the focus lens and the zoom lens reaches the limit value (the optical zoom magnification reaches the limit value), by use of the electronic zoom portion 50, it is possible to perform shooting at higher magnifications.

Below will be presented different embodiments of image sensing apparatuses provided with, as a feature common to them, an electronic zoom portion 50 as described above. Since the configuration and operation described above are common to the different embodiments, no detailed description of them will be repeated. Accordingly, the following description of each embodiment focuses on the configuration and operation of the noise reduction processing portion in the image processing portion 4.

First Embodiment

Figure 5:
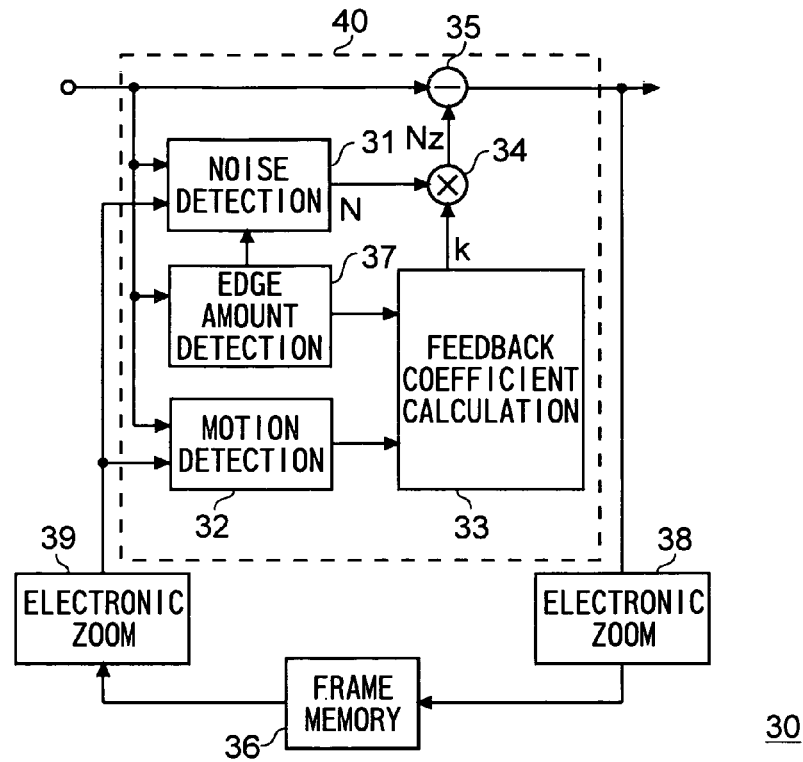
FIG. 5 is a block diagram showing the configuration of a noise reduction processing portion provided in an image processing portion in an image sensing apparatus according to a first embodiment of the invention.

A first embodiment of the present invention will be described below with reference to the relevant drawings. FIG. 5 is a block diagram showing the configuration of a noise reduction processing portion provided within an image processing portion in an image sensing apparatus according to this embodiment.

Figure 22:
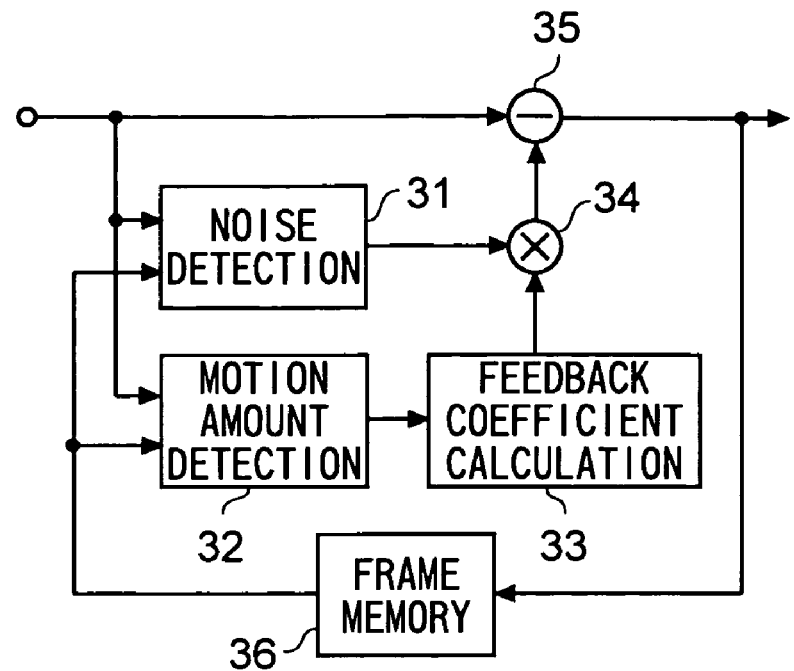
FIG. 22 is a block diagram showing the configuration of a conventional three-dimensional noise reduction processing apparatus.

As compared with the configuration of the three-dimensional noise reduction processing apparatus shown in FIG. 22, the noise reduction processing portion 30 shown in FIG. 5 further comprises: an edge amount detection portion 37 that calculates the edge amount at the pixel of interest targeted by three-dimensional noise reduction processing in the image signal of the current frame; an electronic zoom portion 38 that reduces (diminishes the resolution of) the image signal noise-eliminated by the subtraction portion 35 and outputs the result to the frame memory 36; and an electronic zoom portion 39 that enlarges (augments the resolution of) the image signal stored in the frame memory 36 and outputs the result. Together the noise detection portion 31, the motion amount detection portion 32, the feedback coefficient calculation portion 33, the multiplication portion 34, the subtraction portion 35, and the edge amount detection portion 37 constitute a three-dimensional noise reduction processing portion 40.

In the noise reduction processing portion 30 configured as described above, the three-dimensional noise reduction processing portion 40 receives, on one hand, the image signal of the current frame fed either from a circuit in a stage preceding the noise reduction processing portion 30 within in the image processing portion 4 or from the AFE 2 and, on the other hand, the image signal of the preceding frame temporarily stored in the frame memory 36. As distinct from in the three-dimensional noise reduction apparatus configured as shown in FIG. 22, the image signal of the preceding frame represents an image of lower resolution than the image signal of the current frame, and is therefore enlarged by the electronic zoom portion 39.

The image signals of the current and preceding frames are then inputted to the noise detection portion 31 and to the motion amount detection portion 32 as in the three-dimensional noise reduction processing apparatus configured as shown in FIG. 22, and is also inputted to the edge amount detection portion 37, which is additionally provided here. In the following description, the image signal either from a circuit in a stage preceding the noise reduction processing portion 30 within the image processing portion 4 or from the AFE 2 will be called simply as the "external image signal".

1. Noise Detection

First, the noise detection operation in the noise detection portion 31 will be described. In the noise detection portion 31, first, from the image signal of the current frame inputted from outside, the image signal of the preceding frame read out from the frame memory 36 is subtracted, and thereby the signal value difference x at each pixel is found. Then, based on the thus calculated signal value difference at each pixel, a noise detection value N=f(x) is calculated, which is then outputted to the multiplication portion 34. Here, used as the function f(x) is, for example, a function like the one represented by formula (2) below, which expresses the relationship shown in FIG. 6.

$$f(x) = \begin{cases} -x - 2th & (-2th \leq x < -th) \\ x & (-th \leq x \leq th) \\ -x + 2th & (th < x \leq 2th) \\ 0 & (x < -2th, x > 2th) \end{cases} \quad (2)$$

The function f(x) (see FIG. 6) represented by formula (2) above dictates that, if the absolute value of the signal value difference x at a pixel is greater than a threshold value th (th>0), the corresponding noise detection value N (=f(x)) is reduced. This prevents malfunction of erroneously detecting a motion as noise. The signal value difference x and the noise detection value N are calculated based on the image signals of the current and preceding frames fed in for each pixel of interest. The threshold value th for calculating the noise detection value N is calculated in the edge amount detection portion 37, from the edge amount detected for the pixel of interest. The details of the operation in the edge amount detection portion 37 will be described later.

2. Motion Amount Detection

Figure 7:
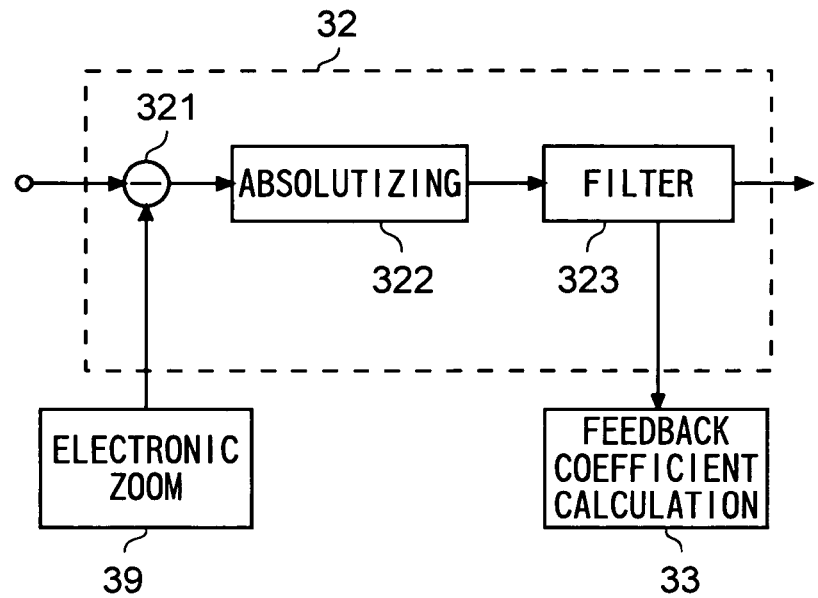
FIG. 7 is a block diagram showing the configuration of a motion amount detecting portion in the noise reduction processing portion shown in FIG. 5.

Next, the configuration of the motion amount detection portion 32 and the operation in the motion amount detection portion 32 for detecting the amount of subject motion will be described. As shown in FIG. 7, the motion amount detection portion 32 comprises: a subtraction portion 321 that receives the image signals of the current and preceding frames and that performs subtraction for each pixel; an absolutizing portion 322 that calculates the absolute value of the difference at each pixel obtained in the subtraction portion 321; and a filter portion 323 that performs filtering processing on the absolute value of the difference at each pixel obtained in the absolutizing portion 322.

Figure 8:
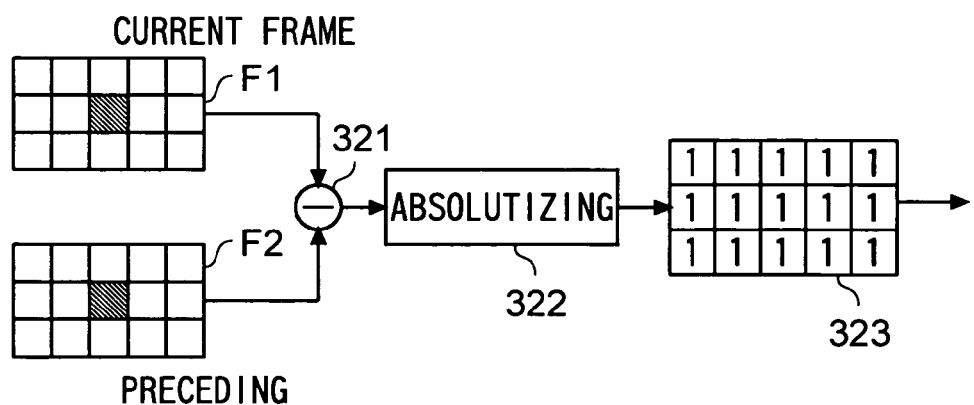
FIG. 8 is an outline operation block of motion amount detection operation by the noise reduction processing portion shown in FIG. 7.

An outline operation block of the motion amount detection operation by the motion amount detection portion 32 configured as shown in FIG. 7 is shown in FIG. 8. As shown in FIG. 8, the image signal F1 of the current frame from outside and the image signal F2 of the preceding frame from the electronic zoom portion 39 are inputted to the subtraction portion 321. Then, in the subtraction portion 321, the difference between the image signals F1 and F2 of the current and preceding frames is calculated for each pixel. Specifically, in the subtraction portion 321, for each pixel position identical between the image signals of the current and preceding frames, the difference between the pixel values there is calculated, and is outputted as a two-frame differential signal to the absolutizing portion 322.

Then, in the absolutizing portion 322, the difference at each pixel position is absolutized (i.e. the absolute value of the difference is calculated), and thereby the differential signal inputted from the subtraction portion 321 is absolutized; the obtained absolutized signal is outputted to the filter portion 323. The filter portion 323 is built as a low-pass filter that averages the pixel values of, for example, m×n pixels (in the case of FIG. 8, 3×5 pixels) centered around the pixel of interest. That is, the absolutized signal from the absolutizing portion 322 is subjected to calculation using a low-pass filter having a filter coefficient of 1 for each of the pixel positions of m×n pixels, and thereby the motion amount at the pixel of interest is calculated.

Here, if a motion arises between the image signals of the preceding and current frames, over the entire region in which the motion has arisen, the absolute values of differences between the two image signals are calculated as relatively great values by the subtraction portion 321 and the absolutizing portion 322. By contrast, if noise arises in any of the preceding and current frames, generally, in a region smaller than when motion has arisen, the absolute values of differences between the two image signals are calculated as relatively great values by the subtraction portion 321 and the absolutizing portion 322. Thus, by applying low-pass filter processing to a sufficiently large region of m×n pixels (in the case of FIG. 8, 3×5 pixels) including the pixel of interest, it is possible to enhance the accuracy of separation between a noise signal and a motion-amount-indicating signal at the pixel of interest.

Specifically, low-pass filter processing is applied to the region of m×n pixels including the pixel of interest, so that the absolute values of the differences at the pixels within that region are averaged. Thus, if a motion arises between the image signals of the preceding and current frames, not only at the pixel of interest, but also at the other pixels within the region to which low-pass filter processing is applied, the absolute values of the differences there are great, and consequently the value after low-pass filter processing by the filter portion 323 is great. By contrast, if noise arises in any of the preceding and current frames, generally, it is at the pixel of interest and at pixels nearby that the absolute values of the differences are great, and consequently the value after low-pass filter processing by the filter portion 323 is small.

As described above, through calculation operations in the different blocks in the motion amount detection portion 32, the value after low-pass filter processing by the filter portion 323 is taken as the motion amount with respect to the pixels of the current frame, and the thus obtained motion amount is outputted to the feedback coefficient detection portion 33. Then the value after low-pass filter processing is outputted as a motion amount from the motion amount detection portion 32. Thus, in the motion amount detection portion 32, as described later, when the motion amount outputted from the motion amount detection portion 32 is greater than a predetermined value, a motion is detected to have arisen, and based on that motion amount, a feedback coefficient can be calculated.

3. Feedback Coefficient Calculation

When fed with the motion amount at each pixel position detected by the motion amount detection portion 32 as described above, the feedback coefficient calculation portion 33 finds, for each pixel, a feedback coefficient by which to multiply the noise amount detected by the noise detection portion 31. Specifically, based on the motion amount y at each pixel inputted from the motion amount detection portion 32, the feedback coefficient detection portion 33 calculates the feedback coefficient k=g(y) for each pixel, and outputs the calculated feedback coefficient k to the multiplication portion 34. Here, used as the function g(y) is, for example, a function like the one represented by formula (3) below, which expresses the relationship shown in FIG. 9.

$$g(y) = \begin{cases} -\frac{1}{thA}y + 1 & (0 \leq y < thA) \\ 0 & (thA \leq y) \end{cases} \quad (3)$$

The function g(y) (see FIG. 9) represented by formula (3) above dictates that, for the motion amount y of each pixel, as its value increases, the feedback coefficient k is made to decrease linearly starting from 1 until, when the motion amount y becomes equal to or more than a threshold value thA, the feedback coefficient k is made equal to zero. In this way, the noise reduction by the noise detection portion 31, that is, three-dimensional noise reduction processing, is made to act with a greater effect on pixels with small motion amounts y, and with a smaller effect on pixels with large motion amounts y. Moreover, the threshold value thA for the motion amount y that makes the feedback coefficient equal to zero is calculated in the edge amount detection portion 37, from the edge amount detected for the pixel of interest. The details of the operation in the edge amount detection portion 37 will be described later.

4. Edge Amount Detection

Next, the operation for detecting the amount of edge in the image signal of the current frame in the edge amount detection portion 37, and the operation for setting the threshold values th and thA based on the detected edge amount will be described. As shown in FIG. 10, the edge amount detection portion 37 comprises: an edge amount calculation portion 371 that calculates an evaluated edge amount with respect to the pixel of interest based on the pixel values of the pixel of interest and of surrounding pixels; a noise detection threshold value calculation portion 372 that calculates the threshold value th for noise detection based on the edge amount calculated by the edge amount calculation portion 371; and a feedback coefficient calculation threshold value calculation portion 373 that calculates the threshold value thA for feedback coefficient calculation based on the edge amount calculated by the edge amount calculation portion 371.

4-1. Edge Amount Calculation

First, the operation for calculating the edge amount of the pixel of interest in the edge amount calculation portion 371 will be described, with reference to the relevant drawings. For the operation for calculating the edge amount here, in addition to the pixel value of the pixel of interest, the pixel values of a plurality of surrounding pixels located around the pixel of interest are used. Here, for example as shown in FIG. 11, the pixel values of 3×3 pixels centered around the pixel of interest X5, namely pixels X1 to X9, are used to calculate the edge amount with respect to the pixel of interest X5.

To calculate the edge amount, the edge amount calculation portion 371 finds the average deviation xmdev of the pixel values of m×n pixels, that is, the pixel of interest and pixels surrounding it, and calculates the edge amount with respect to the pixel of interest. Specifically, in a case where, as shown in FIG. 11, the pixel values of 3×3 pixels centered around the pixel of interest X5, namely pixels X1 to X9, are used, first, the average value xav of the pixel values of the surrounding pixels and of the pixel of interest is calculated according to formula (4) below. Thereafter, by use of this average vale Xav and the pixel values of the pixels X1 to X9, the average deviation of pixels X1 to X9, that is, the surrounding pixels and the pixel of interest, is calculated as the edge amount with respect to the pixel of interest X5 according to formula (5) below.

$$xav = \sum_{i=1}^{9} \frac{xi}{9} \quad (4)$$

$$xmdev = \sum_{i=1}^{9} \frac{|xi - xav|}{9} \quad (5)$$

4-2. Calculating the Threshold Value for Noise Detection

Figure 12:
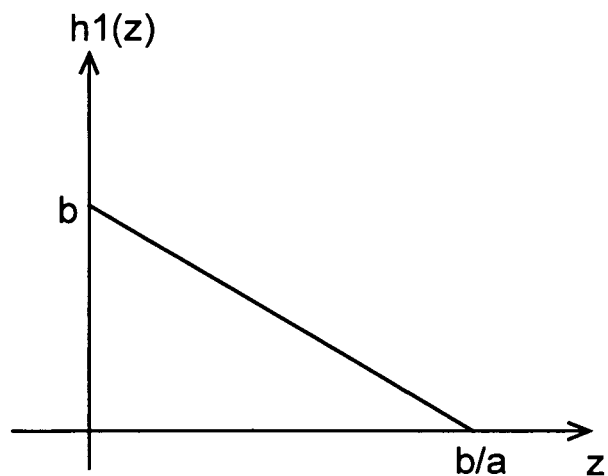
FIG. 12 is a graph showing the function h1(z) used in noise detection threshold calculation operation.

When the edge amount is calculated in the edge amount calculation portion 371 by calculating the average deviation of the pixel of interest and of surrounding pixels, the edge amount calculated in the edge amount calculation portion 371 is fed to the noise detection threshold value calculation portion 372, where the noise detection threshold value th is calculated. Specifically, the noise detection threshold value calculation portion 372 calculates, for the edge amount z of each pixel inputted from the edge amount calculation portion 371, the threshold value th=h1(z), and outputs this threshold value th to the noise detection portion 31. Here, used as the function h1(z) is, for example, a function like the one represented by formula (6) below, which expresses the relationship shown in FIG. 12.

$$h1(z) = \begin{cases} -az + b & \left(0 \leq z < \frac{b}{a}\right) \\ 0 & \left(\frac{b}{a} \leq z\right) \end{cases} \quad (6)$$

The function h1(z) (see FIG. 12) represented by formula (6) above dictates that, for the edge amount z calculated for each pixel, as its value increases, the threshold value th is made to decrease linearly starting from 1 until, when the edge amount z becomes equal to or more than b/a, the threshold value th is made equal to zero. Thus, when the edge amount in the current frame is judged to be large, the threshold value th in the calculation formula in the noise detection portion 31 is made smaller to reduce the influence of noise evaluation, and thereby to reduce blurring occurring in an edge part.

4-3. Calculating the Threshold Value for Feedback Coefficient Calculation

Figure 13:
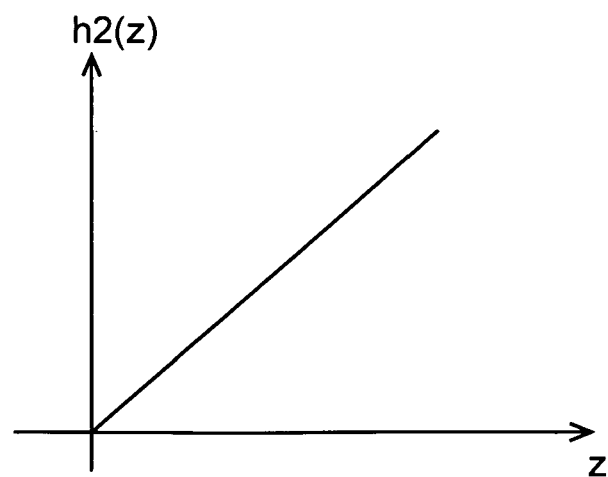
FIG. 13 is a graph showing the function h2(z) used in feedback coefficient calculation threshold calculation operation.

The edge amount calculated by the edge amount calculation portion 371 is also fed to the feedback coefficient calculation threshold value calculation portion 373, where the feedback coefficient calculation threshold value thA is calculated. Specifically, the feedback coefficient calculation threshold value calculation portion 373 calculates, for the edge amount z of each pixel inputted from the edge amount calculation portion 371, the reciprocal 1/thA=h2(z) of the threshold value th, and outputs the threshold value thA obtained from the reciprocal to the feedback coefficient calculation portion 33. Here, used as the function h2(z) is, for example, a function like the one represented by formula (7) below, which expresses the relationship shown in FIG. 13.

Incidentally, the reciprocal 1/thA=h2(z) of the threshold value corresponds to the absolute value of the gradient in the calculation formula according to formula (3) used in the feedback coefficient calculation portion 33.

$$h2(z) = c \times z \quad (0 \leq z) \quad (7)$$

The function h2(z) (see FIG. 13) represented by formula (7) above dictates that, for the edge amount z calculated for each pixel, as its value increases, the reciprocal 1/thA is made to increase linearly. That is, as the edge amount z calculated for each pixel increases, the threshold value thA decreases, and hence the gradient in the calculation formula according to formula (3) becomes sharp. Thus, when the edge amount in the current frame is judged to be large, the threshold value thA in the calculation formula in the noise detection portion 31 is made smaller to reduce the influence of noise evaluation, and thereby to reduce blurring occurring in an edge part.

As a result of the edge amount detection portion 37 operating as described above, it is possible to make a setting such that, when the detected edge amount is large, the probability of detecting noise in the noise detection portion 31 is small, and also to make a setting such that the motion amount detection portion 32 makes the feedback coefficient by which the multiplication portion 34 multiplies small for the motion amount. Thus, for the pixel value of a pixel at which the edge amount detected in the edge amount detection portion 37 is large, the noise amount subtracted in the subtraction portion 35 is reduced, and this makes it possible to reduce blurring in the image occurring after noise reduction. In this embodiment, the value of the threshold value thA is varied based on the edge amount z; alternatively, the motion amount acquired in the motion amount detection portion 32 may be made to vary in proportion to the edge amount z for the same effect.

5. Noise Reduction Processing

When the noise detection value is obtained in the noise detection portion 31 and the feedback coefficient is calculated in the feedback coefficient calculation portion 33 as described above, then the multiplication portion 34 adjusts the noise amount for noise reduction. Specifically, in the multiplication portion 34, for each pixel, the noise detection value N obtained in the noise detection portion 31 is multiplied by the feedback coefficient k outputted from the feedback coefficient calculation portion 33 to calculate the noise amount Nz (=k×N) to be outputted to the subtraction portion 35.

When the noise amount Nz calculated in the multiplication portion 34 is fed to the subtraction portion 35, the subtraction portion 35 performs noise reduction processing on the image signal of each pixel based on the noise amount Nz calculated for each pixel. Specifically, for each pixel, the subtraction portion 35 subtracts the noise amount Nz calculated in the multiplication portion 34 from the image signal of the current frame inputted from outside, thereby acquires a noise-reduced image signal, and outputs it to a succeeding circuit within the image processing portion 4. An example of this succeeding circuit within the image processing portion 4 is a signal processing portion that generates luminance and color-difference signals from the noise-reduced image signal.

When the image signal noise-reduced by the subtraction portion 35 is outputted from the noise reduction processing portion 30 to outside in this way, the image signal noise-reduced by the subtraction portion 35 is fed via the electronic zoom portion 38 to the frame memory 36, where it is temporarily stored for use in noise reduction processing of the image signal of the next frame. When it is stored in the frame memory 36, in accordance with the resolution of the image signal inputted to the noise reduction processing portion 30, the magnification of the electronic zoom portion 38 is set, and the image signal of a low-resolution image is stored in the frame memory 36. Likewise, if resolution differs between the image signal of the preceding frame stored in the frame memory 36 and the image signal of the current frame inputted from outside to the noise reduction processing portion 30, the magnification of the electronic zoom portion 39 is so set that the resolution of the image signal of the preceding frame is equivalent to the resolution of the current frame.

6. Noise Reduction Processing Operation in Still Image Shooting

While the different blocks of the noise reduction processing portion 30 operate as described above, when still image shooting is requested via the operated portion 15, as described above, until shutter-release operation is requested via the operated portion 15, the image signal of a low-resolution through image is fed to the image processing portion 4. Thereafter, when shutter-release operation is requested via the operated portion 15, a high-resolution image with resolution equivalent to the number of pixels of the image sensor within the image sensing portion 1 is fed to the image processing portion 4. Now the noise reduction processing operation in such still image shooting will be described separately for (1) a case where a through image is acquired and (2) a case where a still image immediately after shutter-release operation is acquired.

6-1. When a Through Image is Acquired

Figure 14A:
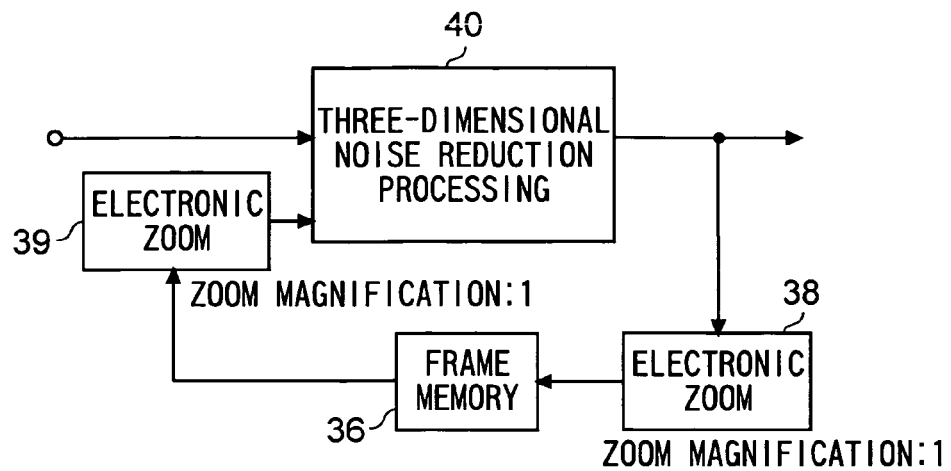
FIG. 14A is a diagram showing the state of the noise reduction processing portion on acquisition of a through image.

When a through image is acquired, an image signal that has been resolution-diminished through summation averaging is fed to the image processing portion 4; thus the noise reduction processing portion 30 receives a low-resolution image signal. Accordingly, the noise reduction processing portion 30 handles an already resolution-diminished image signal, and thus the image signal noise-eliminated by the subtraction portion 35 does not need to be resolution-diminished. Hence, as shown in FIG. 14A, the zoom magnification of both the electronic zoom portions 38 and 39 is set at 1.

With the zoom magnification of the electronic zoom portions 38 and 39 set at 1 in this way, the electronic zoom portion 38 stores, sequentially for one pixel after another, the image signal noise-eliminated by the subtraction portion 35. The electronic zoom portion 39 reads out from the frame memory 36, sequentially for one pixel after another, the noise-reduced image signal of the preceding frame stored in the frame memory 36, and outputs it to the noise detection portion 31, to the motion amount detection portion 32, and to the edge amount detection portion 37. Here, the frame memory 36 is addressed such that the pixel position of the image signal read out from the frame memory 36 corresponds to the pixel position of the image signal of the current frame inputted to the noise reduction processing portion 30.

Thus, for acquisition of a through image, the image signal of a low-resolution image is inputted; thus, the image signal of the preceding frame is read out from the frame memory 36 without changing the magnification, the noise amount and motion amount compared with the image signal of the current frame are detected, and noise reduction processing is applied to the image signal of the current frame. Since the image signal of the current frame thus having undergone noise reduction processing is an image signal of a low-resolution image, it is stored in the frame memory 36 with its magnification unchanged.

6-2. When a Still Image is Acquired

Figure 14B:
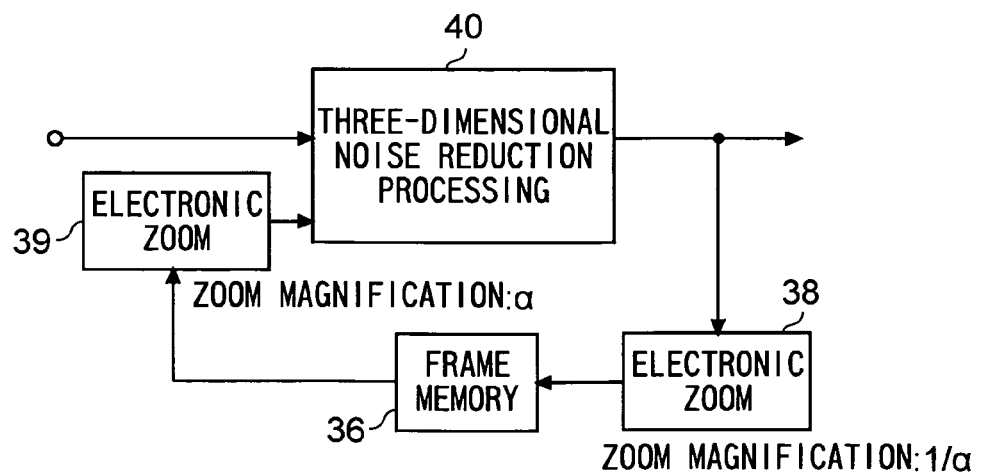
FIG. 14B is a diagram showing the state of the noise reduction processing portion on acquisition of a still image.

While a through image is being acquired as described above, when shutter-release operation is requested via the operated portion 15, a still image, which is a high-resolution image, is acquired, and the image signal based on this still image is fed to the image processing portion 4. Here, the noise reduction processing portion 30 receives an image signal of high resolution and, since the image signal read out form the frame memory 36 represents a low-resolution image, the noise reduction processing portion 30 needs to augment the resolution of the image signal from the frame memory 36. Accordingly, as shown in FIG. 14B, the zoom magnification of the electronic zoom portion 39 is set at $\alpha$ ($\alpha$>1).

With the zoom magnification of the electronic zoom portion 39 set at a in this way, the electronic zoom portion 39 enlarges (augments the resolution of) the image signal read out from the frame memory 36. Specifically, in the electronic zoom portion 39, which is configured similarly to the electronic zoom portion 50 in FIG. 3 previously described, enlargement processing (resolution augmentation processing) as described previously under "(4) Electronic Zoom Processing" is performed on the image signal read out from the frame memory 36. As a result, the image signal of the through image of the preceding frame stored in the frame memory 36 is enlarged into a high-resolution image by the zoom portion 39 to have resolution equivalent to the image signal of the current frame fed from outside to the noise reduction processing portion 30.

Thus, for acquisition of a still image immediately after shutter-release operation, the image signal of the through image of the preceding frame is read out from the frame memory 36, and is then enlarged by a factor of a in the electronic zoom portion 39 so that its resolution is changed to be identical with that of the image signal inputted as the still image. Then, by use of the enlarged image signal of the preceding frame, the noise amount and motion amount compared with the image signal of the current frame are detected, and noise reduction processing is applied to the image signal of the current frame.

When the image signal of the current frame thus having undergone noise reduction processing, that is, the image signal of the still image, is outputted in this way, if no noise reduction processing needs to be applied to the next frame, the storage of the image signal of the still image in the frame memory 36 is omitted. In a case where, after completion of shutter-release operation, a through image is acquired again, the zoom magnification of the electronic zoom portion 38 is set at $1/\alpha$, and the image signal of the still image after noise reduction processing is reduced (its resolution is diminished) and is then stored in the frame memory 36. The reduction operation by the electronic zoom portion 38 here may be achieved through summation averaging as in generation of a through image, or may be achieved through thinning-out in which only the pixel values at the pixel positions after reduction are read out.

Figure 15:
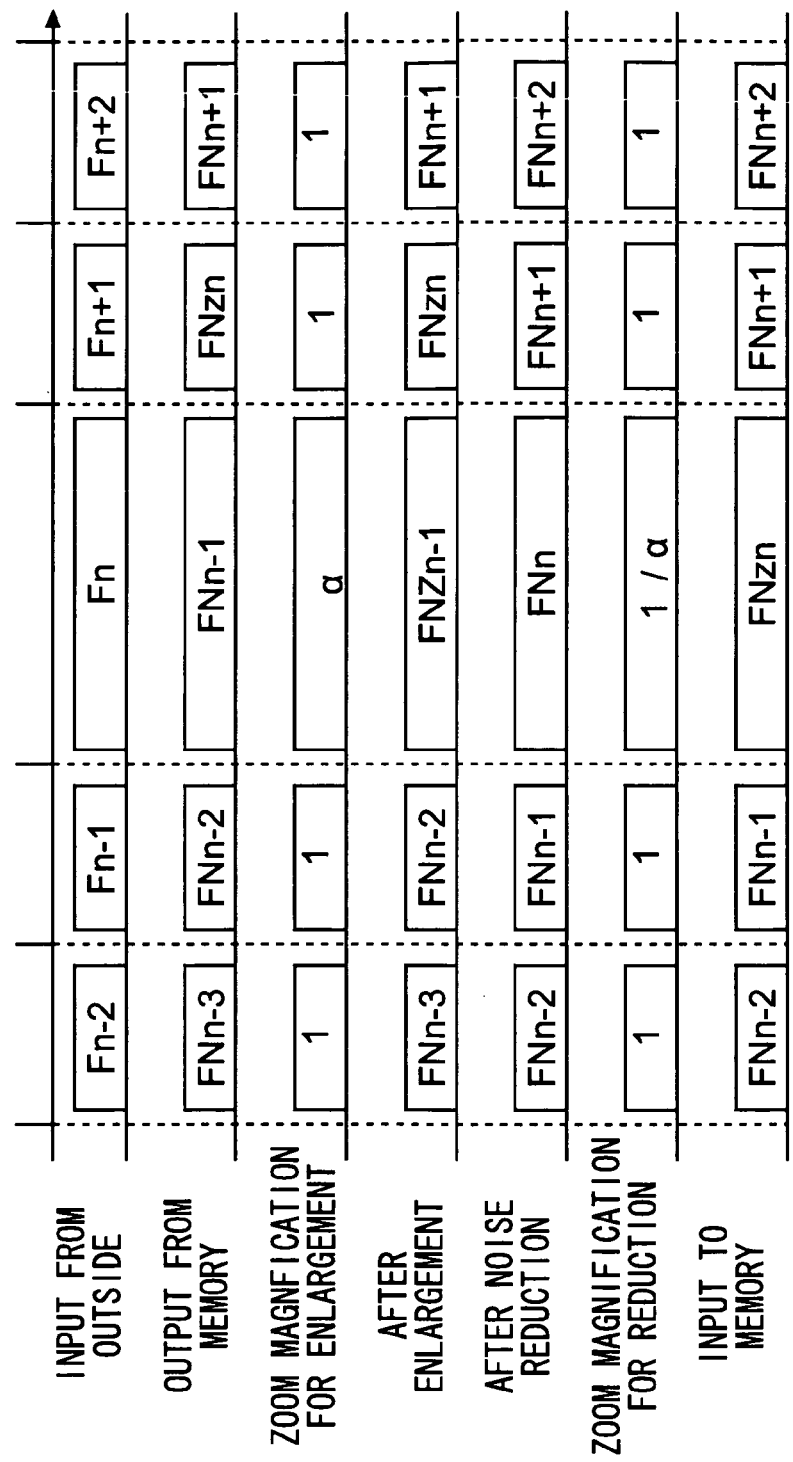
FIG. 15 is a timing chart showing the states of the signals at relevant points during still image shooting.
Figure 16:
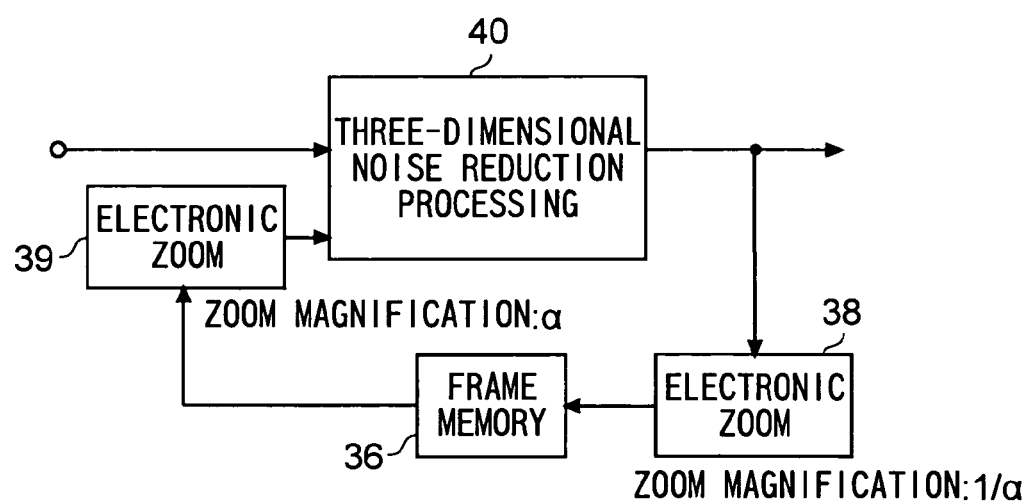
FIG. 16 is a diagram showing the state of the noise reduction processing portion on acquisition of a moving image.

Thus, in still image shooting, as shown in a timing chart in FIG. 15, in a case where the image signal Fn of a still image, which is a high-resolution image, is acquired in the nth frame, the image signals F1 to Fn−1 up to the (n−1)th frame are through images, which are low-resolution images. Accordingly, the zoom magnification of the electronic zoom portions 38 and 39 is set at 1 so that, without being either reduced or enlarged, the image signals F1 to Fn−1 are written in to and read out from the frame memory 36.

Specifically, when the image signal Fmx ($1 \leq mx \leq n-1$) of a through image is inputted from outside, the image signal FNmx−1 after noise reduction processing is read out from the frame memory 36, and is, without being enlarged by the electronic zoom portion 39, fed to the noise detection portion 31, to the motion amount detection portion 32, and to the edge amount detection portion 37. Then, from the subtraction portion 35, the image signal FNmx having undergone noise reduction processing is outputted, and is, without being reduced by the electronic zoom portion 38, stored in the frame memory 36.

Thereafter, when the image signal Fn of the still image of the nth frame is inputted, the zoom magnification of the electronic zoom portion 39 is set at $\alpha$, and enlargement processing is applied to the image signal FNn−1 read out from the frame memory 36. The image signal FNZn−1 thus enlarged by the electronic zoom portion 39 is fed to the noise detection portion 31, to the motion amount detection portion 32, and to the edge amount detection portion 37, and an image signal FNn having undergone three-dimensional noise reduction processing is outputted.

Then, in a case where the image signals Fmy (n+1≦my) after the (n+1)th frame are again image signals of through images, as shown in the timing chart of FIG. 15, when the image signal Fn of the still image of the nth frame is inputted, the zoom magnification of the electronic zoom portion 38 is set at $1/\alpha$. Thus reduction processing at a zoom magnification of $1/\alpha$ is applied to the image signal FNn having undergone noise reduction processing, and a reduced image signal FNzn is stored in the frame memory 36. Thereafter, the magnification of the electronic zoom portions 38 and 39 is set back at 1 as when the image signals Fmx before the (n−1) frame are inputted, and noise reduction processing is applied to the through image.

7. Noise Reduction Processing Operation in Moving Image Shooting

Figure 6:
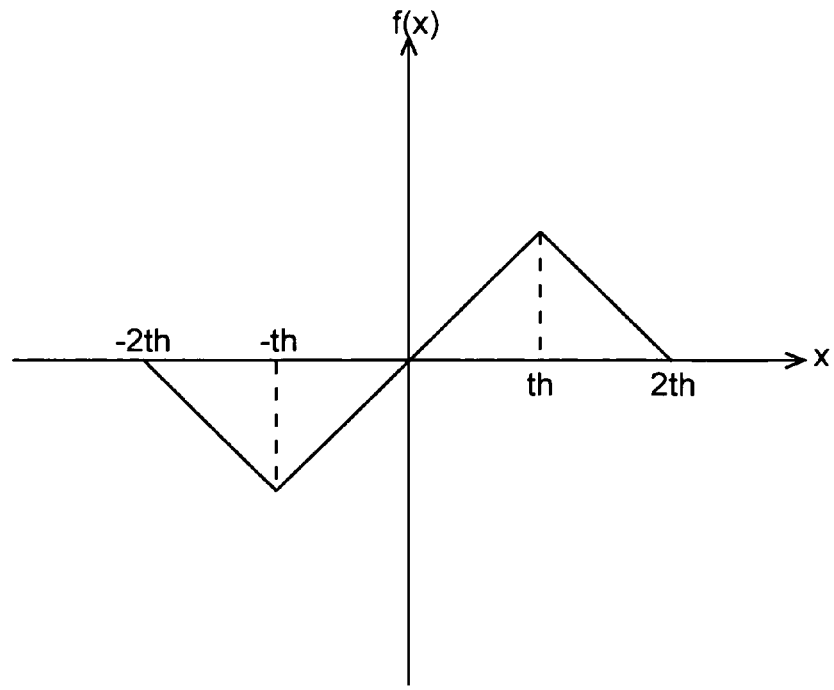
FIG. 6 is a graph showing the function f(x) used in noise detection operation.

When moving image shooting is requested via the operated portion 15, as when a still image is acquired as described above, the image signal of a high-resolution image of resolution equivalent to the number of pixels of the image sensor within the image sensing portion 1 is fed continuously to the image processing portion 4. Thus, as shown in FIG. 6, the magnifications of the electronic zoom portions 38 and 39 are set at $1/\alpha$ and a respectively. Accordingly, on the one hand, the electronic zoom portion 38 reduces (diminishes the resolution of) the image signal noise-eliminated by the subtraction portion 35 and, on the other hand, the electronic zoom portion 39 enlarges (augments the resolution of) the image signal read out from the frame memory 36.

With the zoom magnifications of the electronic zoom portions 38 and 39 set at $1/\alpha$ and $\alpha$ respectively in this way, the electronic zoom portion 38 reduces the image signal after noise reduction processing obtained in the subtraction portion 35 and stores the result in the frame memory 36; the electronic zoom portion 39 applies enlargement processing to the image signal read out from the frame memory 36. Here, the electronic zoom portions 38 and 39 perform reduction and enlargement processing through the operation described previously under "(4) Electronic Zoom Processing".

When the electronic zoom portion 38, which performs reduction processing, is given a configuration similar to that of the electronic zoom portion shown in FIG. 3, instead of the frame memory 36, a line memory corresponding to the number of pixels needed for reduction processing in the vertical direction is provided. The electronic zoom portion 38 may be, for example, one that achieves reduction through summation averaging as in generation of a through image, or may be one that achieves reduction through thinning-out in which only the pixel values at the pixel positions after reduction are read out.

Figure 17:
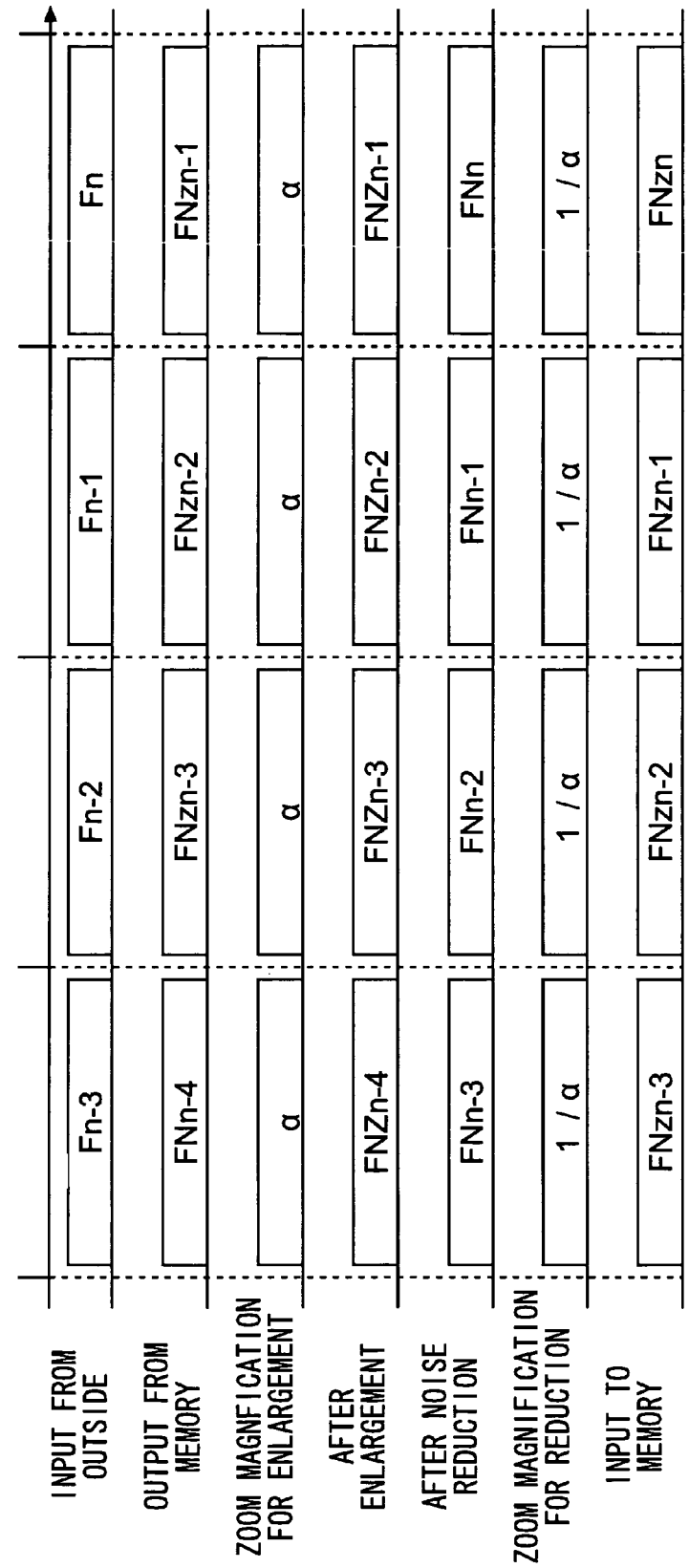
FIG. 17 is a timing chart showing the states of the signals at relevant points during still image shooting.

Thus, when moving image shooting is requested via the operated portion 15, in the timing chart of FIG. 17, the image signal FNzn−1 of the preceding frame stored in the frame memory 36 is read out, and is enlarged at a zoom magnification of a by the electronic zoom portion 39 so as to have resolution equivalent to the image signal Fn of the current frame inputted from outside. Thus, the image signal Fn of the current frame, and the image signal FNZn−1 of the preceding frame as enlarged by the electronic zoom portion 39, are inputted to the noise detection portion 31, to the motion amount detection portion 32, and to the edge amount detection portion 37.

As a result of the different blocks of the noise reduction processing portion 30 operating as described above, from the subtraction portion 35, the image signal FNn of the current frame having undergone three-dimensional noise reduction processing is outputted. When the image signal FNn of the current frame having undergone three-dimensional noise reduction processing is outputted in this way, the image signal FNn is also fed to the electronic zoom portion 38, where it is reduced at a zoom magnification of $\alpha$. Thus, in the frame memory 36, the image signal FNzn of the current frame reduced by the electronic zoom portion 38 is stored for use in three-dimensional noise reduction processing of the next frame.

Also in moving image shooting, as in still image shooting, it is possible, until starting of shutter-release operation is requested via the operated portion 15, to acquire through images and let the display 9 display images based on the through images and to set the zoom magnification of the electronic zoom portions 38 and 39 at 1. It is also possible, when ending of moving image shooting is requested via the operated portion 15, as before starting of moving image shooting, to acquire through images to let the display 9 display images based on the through images and to set the zoom magnification of the electronic zoom portions 38 and 39 at 1.

Second Embodiment

Figure 18:
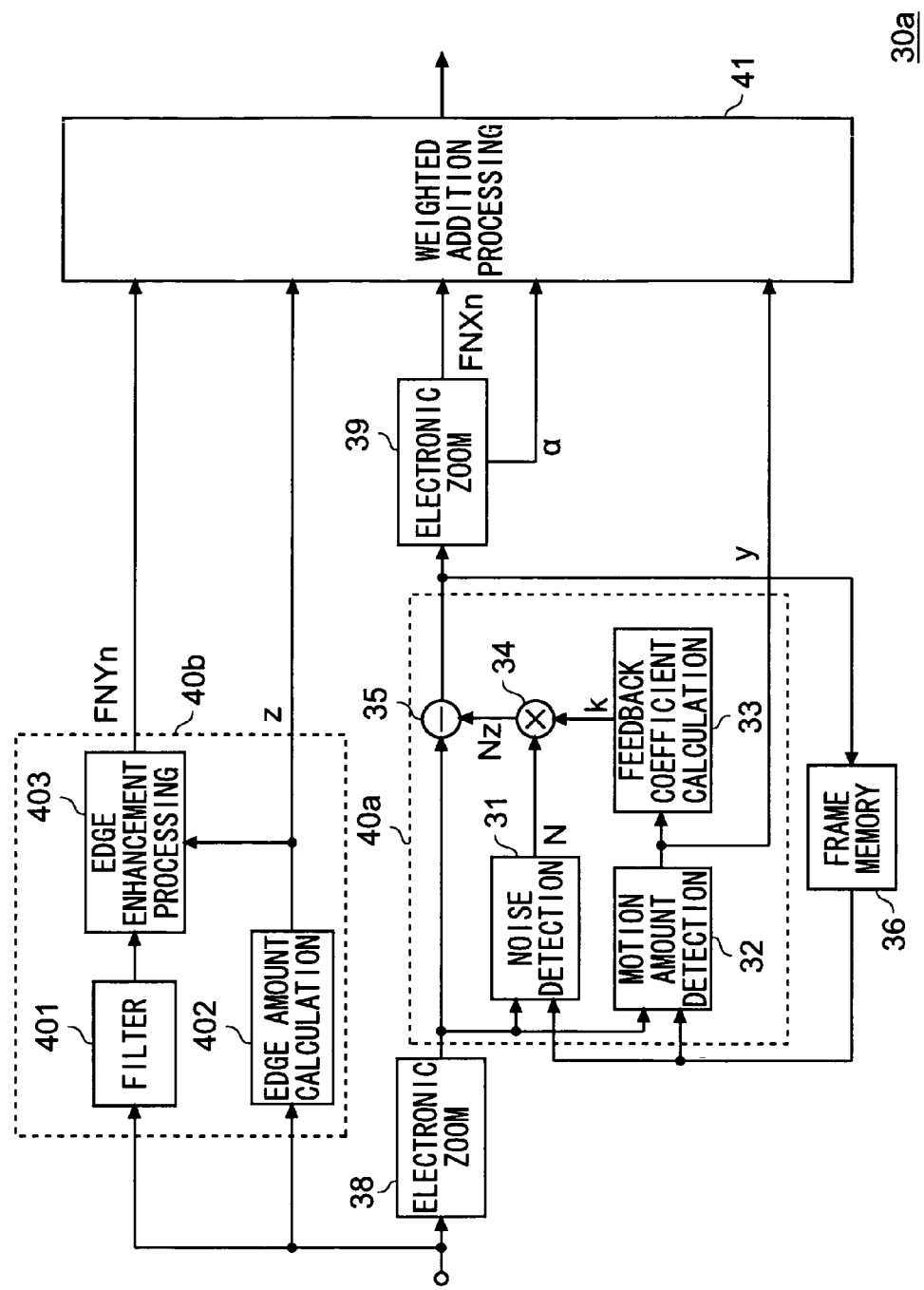
FIG. 18 is a block diagram showing a configuration of a noise reduction processing portion provided in an image processing portion in an image sensing apparatus according to a second embodiment of the invention.

A second embodiment of the present invention will be described below with reference to the relevant drawings. FIG. 18 is a block diagram showing the configuration of a noise reduction processing portion provided within an image processing portion in an image sensing apparatus according to this embodiment. In the configuration of the noise reduction processing portion shown in FIG. 18, such parts as find their counterparts in the noise reduction processing portion of FIG. 5 are identified by common reference signs, and no detailed description of them will be repeated.

The noise reduction processing portion 30a shown in FIG. 18 comprises: an electronic zoom portion 38 that reduces an image signal inputted from outside; a three-dimensional noise reduction processing portion 40a that performs three-dimensional noise reduction processing on the image signal reduced by the electronic zoom portion 38; a frame memory 36 that stores the image signal having undergone noise reduction processing by the three-dimensional noise reduction processing portion 40a; an electronic zoom portion 39 that enlarges the image signal having undergone noise reduction processing by the three-dimensional noise reduction processing portion 40a; a two-dimensional noise reduction processing portion 40b that performs two-dimensional noise reduction processing on the image signal inputted from outside; and a weighted addition processing portion 41 that performs weighted addition of the image signal having undergone three-dimensional noise reduction processing and then enlarged by the electronic zoom portion 39 and the image signal having undergone two-dimensional noise reduction processing by the two-dimensional noise reduction processing portion 40b.

As shown in FIG. 18, the three-dimensional noise reduction processing portion 40a has the same configuration as the three-dimensional noise reduction processing portion 40 shown in FIG. 5 except that the edge amount detection portion 37 is omitted, and forms, along with the frame memory 36, the conventional three-dimensional noise reduction processing apparatus of FIG. 22. The two-dimensional noise reduction processing portion 40b comprises: a filter portion 401 that performs noise reduction processing by performing weighted addition of the pixel values of a pixel of interest and of pixels surrounding it; an edge amount calculation portion 402 that operates similarly to the edge amount calculation portion 371 shown in FIG. 10; and an edge enhancement processing portion 403 that, based on the edge amount calculated by the edge amount calculation portion 402, performs edge enhancement processing on the image signal having passed through the filter portion 401.

1. Three-Dimensional Noise Reduction Processing

In the configuration shown in FIG. 18, the three-dimensional noise reduction processing portion 40a receives image signals of low resolution from the frame memory 36 and the electronic zoom portion 38 respectively, and the image signal of the current frame fed from the electronic zoom portion 38 is subjected to three-dimensional noise reduction processing. The operation of the individual blocks within the three-dimensional noise reduction processing portion 40a is the same as the operation of the individual blocks constituting the three-dimensional noise reduction processing portion 40 within the noise reduction processing portion 30 of the first embodiment, and therefore for a detailed description in this respect, the first embodiment is to be referred to, and no overlapping description will be repeated.

1-1. When a Through Image is Acquired

When a through image is acquired, the zoom magnification in both the electronic zoom portions 38 and 39 is set at 1, so that the image signal of the through image is, without being reduced, fed to the three-dimensional noise reduction processing portion 40a. The image signal having undergone three-dimensional noise reduction processing in the three-dimensional noise reduction processing portion 40a is stored in the frame memory 36, and is also, without being enlarged by the electronic zoom portion 39, outputted to the weighted addition processing portion 41.

1-2. In Moving or Still Image Shooting

By contrast, when shutter-release operation is requested via the operated portion 15 and a still image is acquired or shooting of a moving image is started, the zoom magnifications in the electronic zoom portions 38 and 39 are set at $1/\alpha$ and $\alpha$ respectively. Thus, when a still or moving image, which is a high-resolution image, is inputted as the image signal of the current frame, the image signal of the current frame thus inputted is reduced (its resolution is diminished) at a zoom magnification of $1/\alpha$ in the electronic zoom portion 38.

Then, when the thus resolution-diminished image signal of the current frame is fed to the three-dimensional noise reduction processing portion 40a, the low-resolution image stored in the frame memory 36 is, as the image signal of the preceding frame, fed to the three-dimensional noise reduction processing portion 40a, so that the image signal of the current frame is subjected to three-dimensional noise reduction processing. The image signal of the current frame thus having undergone three-dimensional noise reduction processing is stored in the frame memory 36, and is also enlarged at a zoom magnification of $\alpha$ in the electronic zoom portion 39 and then outputted to the weighted addition processing portion 41.

2. Two-Dimensional Noise Reduction Processing

Concurrently with the above-described three-dimensional noise reduction processing by the three-dimensional noise reduction processing portion 40a, whereby temporal noise is eliminated, the two-dimensional noise reduction processing portion 40b performs two-dimensional noise reduction processing, whereby spatial noise is eliminated from the image signal of the current frame. The two-dimensional noise reduction processing in the two-dimensional noise reduction processing portion 40b will be described in brief below.

In the two-dimensional noise reduction processing portion 40b, the filter portion 401 performs low-pass filtering processing on the pixel of interest and pixels surrounding it to eliminate spatial noise. It is here assumed that, in the filter portion 401, as shown in FIG. 11, the pixel values of 3×3 pixels centered around the pixel of interest X5, namely pixels X1 to X9, are used. The filter portion 401 is configured as, for example, a low-pass filter that multiplies by a coefficient of $1/9$ each of the pixel values of the 3×3 pixels, namely pixels X1 to X9, and then adds up the results. With the filter portion 401 configured in this way, noise that has arisen in the pixel of interest X5 is reduced by being smoothed with the pixel values of the surrounding pixels X1 to X4 and X6 to X9.

On the other hand, like the edge amount calculation portion 371 within the edge amount detection portion 37 in FIG. 10, the edge amount calculation portion 402 performs calculations according to formulae (4) and (5) noted previously on the pixel of interest to calculate, as the edge amount, the average deviation in the pixel of interest. When the edge amount calculated in the edge amount calculation portion 402 is fed to the edge enhancement processing portion 403, the edge enhancement processing portion 403 performs edge enhancement processing by performing weighted addition of the edge amount fed to it to the image signal of the current frame noise-eliminated by the filter portion 401.

Having undergone noise reduction in the filter portion 401 and edge enhancement in the edge enhancement processing portion 403, the thus processed image signal of the current frame is outputted to the weighted addition processing portion 41. As distinct from the three-dimensional noise reduction processing portion 40a, the two-dimensional noise reduction processing portion 40b is fed with an image signal that has not undergone reduction processing by the electronic zoom portion 38 irrespective of whether or not the image is a through image. The image signal having undergone two-dimensional noise reduction processing in the two-dimensional noise reduction processing portion 40b, as distinct from the three-dimensional noise reduction processing portion 40a, is outputted directly to the weighted addition processing portion 41.

3. Weighted Addition Processing

As described above, the weighted addition processing portion 41 receives, on one hand, the image signal FNXn of the current frame having undergone three-dimensional noise reduction processing and then enlarged (resolution-augmented) by the electronic zoom portion 39 and, on the other hand, the image signal FNYn of the current frame having undergone two-dimensional noise reduction processing in the two-dimensional noise reduction processing portion 40b. The weighted addition processing portion 41 then performs weighted addition of the image signals FNXn and FNYn, and outputs a noise-reduced image signal FNn of the current frame. The configuration of the weighted addition processing portion 41 and the operation of the individual blocks constituting it will be described below with reference to the relevant drawings.

Figure 19:
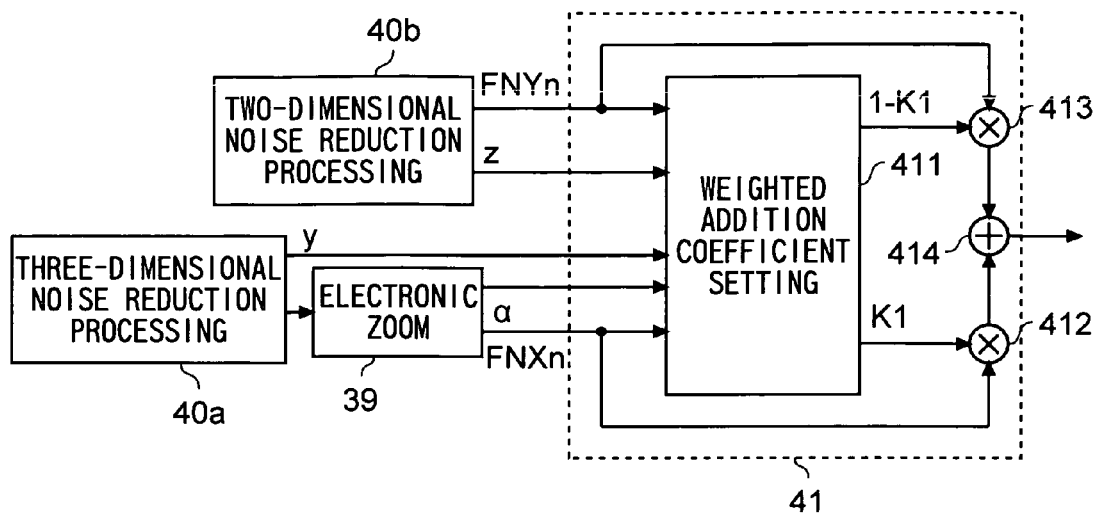
FIG. 19 is a block diagram showing the configuration of a weighted addition processing portion provided in the noise reduction processing portion shown in FIG. 18.

As shown in FIG. 19, the weighted addition processing portion 41 comprises: a weighted addition coefficient setting portion 411 that sets the weighted addition coefficients K1 and 1−K1 by which to multiply the image signal FNXn having undergone three-dimensional noise reduction processing and the image signal FNYn having undergone two-dimensional noise reduction processing respectively; a multiplication portion 412 that multiplies the image signal FNXn by the weighted addition coefficient K1 set in the weighted addition coefficient setting portion 411; a multiplication portion 413 that multiplies the image signal FNYn by the weighted addition coefficient 1−K1 set in the weighted addition coefficient setting portion 411; and an addition portion 414 that adds up the image signals multiplied by the weighted addition coefficients in the multiplication portions 412 and 413.

In the weighted addition processing portion 41 configured as described above, the weighted addition coefficient setting portion 411 is fed with the edge amount calculated by the edge amount calculation portion 402 in the two-dimensional noise reduction processing portion 40b, the zoom magnification set by the electronic zoom portion 38 or 39, and the motion amount detected by the motion amount detection portion 32 in the three-dimensional noise reduction processing portion 40a, and calculates the weighted addition coefficients K1 and 1−K1. It is here assumed that the weighted addition coefficient setting portion 411 is fed with the motion amount y, the edge amount z, and the zoom magnification α set by the electronic zoom portion 39. When a through image is fed in, the zoom magnification is set at "1", that is, unit magnification.

The operation for setting the weighted addition coefficients K1 and 1−K1 in the weighted addition coefficient setting portion 411 fed with the motion amount y, the edge amount z, and the zoom magnification α will be described below. The weighted addition coefficient K1 is given by formula (8) below; that is, its value is calculated by multiplying together an edge weighted addition coefficient β, which is set based on the edge amount z and the zoom magnification α, and a motion weighted addition coefficient γ, which is set based on the motion amount y.

$$K1 = \beta \times \gamma \qquad (8)$$

Although the description here assumes use of the zoom magnification α, a pixel number reduction factor that is proportional to the zoom magnification α may instead be used. The pixel number reduction factor represents the factor by which to reduce the number of pixels when a high-resolution image inputted from outside is converted into a low-resolution image stored in the frame memory 36. Thus, the greater the pixel number reduction factor, the greater the zoom magnification α set by the electronic zoom portion 39. Instead of the zoom magnification α set by the electronic zoom portion 39, the zoom magnification 1/α set by the electronic zoom portion 38 may be fed in so that its reciprocal may be used.

3-1. Calculating the Edge Weighted Addition Coefficient β

First, how the edge weighted addition coefficient β is calculated will be described. When the zoom magnification α is fed in from the electronic zoom portion 39, a correction value δ (=α×D) that is proportional to the zoom magnification α is calculated. Since the edge amount z for one pixel after another is fed in from the edge amount calculation portion 402, the product δ×z of multiplication of the edge amount z by the correction value δ is calculated for one pixel after another. This edge amount z as corrected with the correction value δ, that is, δ×z, is so set as to increase, as does the correction value δ, as the zoom magnification α increases.

Figure 20A:
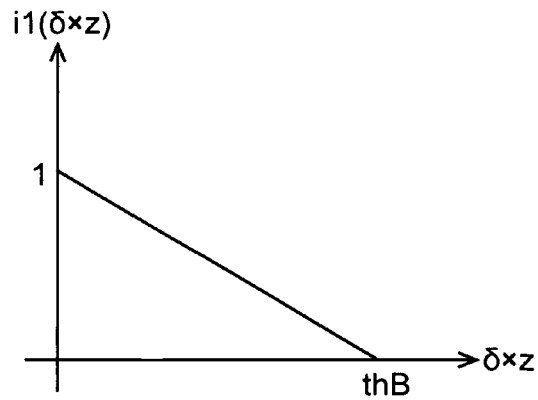
FIG. 20A is a graph showing the function i1(δ×z) used in calculation of an edge weighted addition coefficient and a motion weighted addition coefficient

Then, based on the corrected edge amount δ×z calculated for each pixel, the edge weighted addition coefficient β=i1(δ×z) is calculated for each pixel. Here, used as the function i1(δ×z) is, for example, a function like the one represented by formula (9) below, which expresses the relationship shown in FIG. 20A.

$$i1(\delta \times z) = \begin{cases} -\frac{1}{thB} \delta \times z + 1 & (0 \le \delta \times z < thB) \\ 0 & (thB \le \delta \times z) \end{cases} \qquad (9)$$

The function i1(δ×z) (see FIG. 20A) represented by formula (9) above dictates that, for the corrected edge amount δ×z calculated for each pixel, as its value increases, the edge weighted addition coefficient β is made to decrease starting with 1 until, when the corrected edge amount δ×z becomes equal to or more than a threshold value thB, the edge weighted addition coefficient is made equal to zero. In this way, for a pixel at which the edge amount z is large, the edge weighted addition coefficient β is made smaller to make smaller the proportion of the image signal FNXn having undergone three-dimensional noise reduction processing with which the image signal FNYn having undergone two-dimensional noise reduction processing is subjected to weighted addition.

Specifically, since the image signal FNXn having undergone three-dimensional noise reduction processing is fed in after being enlarged by the electronic zoom portion 39, blurring occurs in an edge part. Making the weighted addition coefficient K1 smaller makes smaller the proportion in which the image signal FNXn participates in weighted addition. This helps reduce the influence, on an edge part, of the image signal FNXn having undergone three-dimensional noise reduction processing and thereby reduce the blurring that occurs in an edge part in the image signal after weighted addition.

As the pixel number reduction factor or the zoom magnification α increases, the blurring in an edge part of the image signal FNXn having undergone three-dimensional noise reduction processing becomes more notable. To cope with this, the correction value δ for correcting the edge amount z is increased so that the corrected edge amount δ×z given by formula (9) above is increased. In this way, when the pixel number reduction factor or the zoom magnification α increases, the value of the weighted addition coefficient K1 calculated with the function i1(δ×z) represented by formula (9) is reduced to reduce the influence of the image signal FNXn having undergone three-dimensional noise reduction processing, thereby to reduce blurring occurring in an edge part.

3-2. Calculating the Motion Weighted Addition Coefficient γ

Figure 20B:
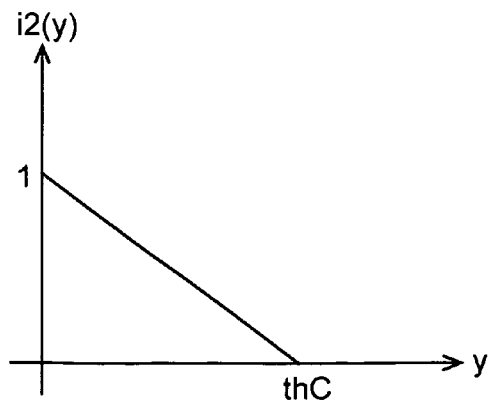
FIG. 20B is a graph showing the function i2(y) used in calculation of an edge weighted addition coefficient and a motion weighted addition coefficient.

On the other hand, when the motion amount y at each pixel position detected by the motion amount detection portion 32 is fed in, the weighted addition coefficient setting portion 411 calculates the motion weighted addition coefficient γ for each pixel. Specifically, based on the motion amount y detected for each pixel, the motion weighted addition coefficient γ=i2(y) for each pixel is calculated. Here, used as the function i2(y) is, for example, a function like the one represented by formula (10) below, which expresses the relationship shown in FIG. 20B.

$$i2(y) = \begin{cases} -\frac{1}{thC} y + 1 & (0 \le y < thC) \\ 0 & (thC \le y) \end{cases} \qquad (10)$$

The function i2(y) (see FIG. 20B) represented by formula (10) above dictates that, for the motion amount y detected for each pixel, as its value increases, the motion weighted addition coefficient γ is made to decrease starting with 1 until, when the motion amount y becomes equal to or more than a threshold value thC, the motion weighted addition coefficient γ is made equal to zero. In this way, for a pixel at which the motion amount y is large, the motion weighted addition coefficient γ is made smaller to make smaller the proportion of the image signal FNXn having undergone three-dimensional noise reduction processing with which the image signal FNYn having undergone two-dimensional noise reduction processing is subjected to weighted addition.

Specifically, when the three-dimensional noise reduction processing portion 40a performs three-dimensional noise reduction processing, as the motion amount y increases, the feedback coefficient calculated by the feedback coefficient calculation portion 33 decreases, and this reduces the amount of noise subtracted. Thus, in the image signal FNXn having undergone three-dimensional noise reduction processing, for a pixel at which the motion amount y is detected to be large, the amount of noise reduced is small; accordingly, the weighted addition coefficient K1 is made smaller to make smaller the proportion in which the image signal FNXn participates in the weighted addition. This helps reduce the influence, on pixels containing a large motion amount, of the image signal FNXn having undergone three-dimensional noise reduction processing and thereby make proper the amount of noise reduced in the image signal after weighted addition.

3-3. Weighted Addition

As described above, in the weighted addition coefficient setting portion 411, based on the edge amount z and the zoom magnification α, with the function represented by formula (9) above, the edge weighted addition coefficient β is calculated and, based on the motion amount y, with the function represented by formula (10) above, the motion weighted addition coefficient γ is calculated. Then, according to formula (8) above, the edge weighted addition coefficient β and the motion weighted addition coefficient γ are multiplied together to calculate the weighted addition coefficient K1 to be fed to the multiplication portion 412 and then, from this weighted addition coefficient K1, the weighted addition coefficient 1−K1 to be fed to the multiplication portion 412 is calculated.

The weighted addition coefficients K1 and 1−K1 calculated by the weighted addition coefficient setting portion 411 are fed to the multiplication portions 412 and 413 respectively so that, by those coefficients, the image signals FNXn and FNYn are multiplied. The results of multiplication by the multiplication portions 412 and 413 are fed to the addition portion 414, which then outputs an image signal KNX (=K1×FNXn+(1−K1)×FNYn) as the result of weighted addition of the image signal FNXn having undergone three-dimensional noise reduction processing and the image signal FNYn having undergone two-dimensional noise reduction processing.

As described above, in this embodiment, when an image signal having undergone three-dimensional noise reduction processing is subjected to weighted addition with an image signal having undergone two-dimensional noise reduction processing, at a pixel position where the edge amount or motion amount is large, the weight coefficient for the image signal having undergone three-dimensional noise reduction processing is made smaller to reduce the influence of the motion amount or of enlargement in an electronic zoom portion. Moreover, performing three-dimensional noise reduction processing based on the image signal of a low-resolution image helps reduce the data size of the image signal of the preceding frame stored for three-dimensional noise reduction processing.

Figure 21:
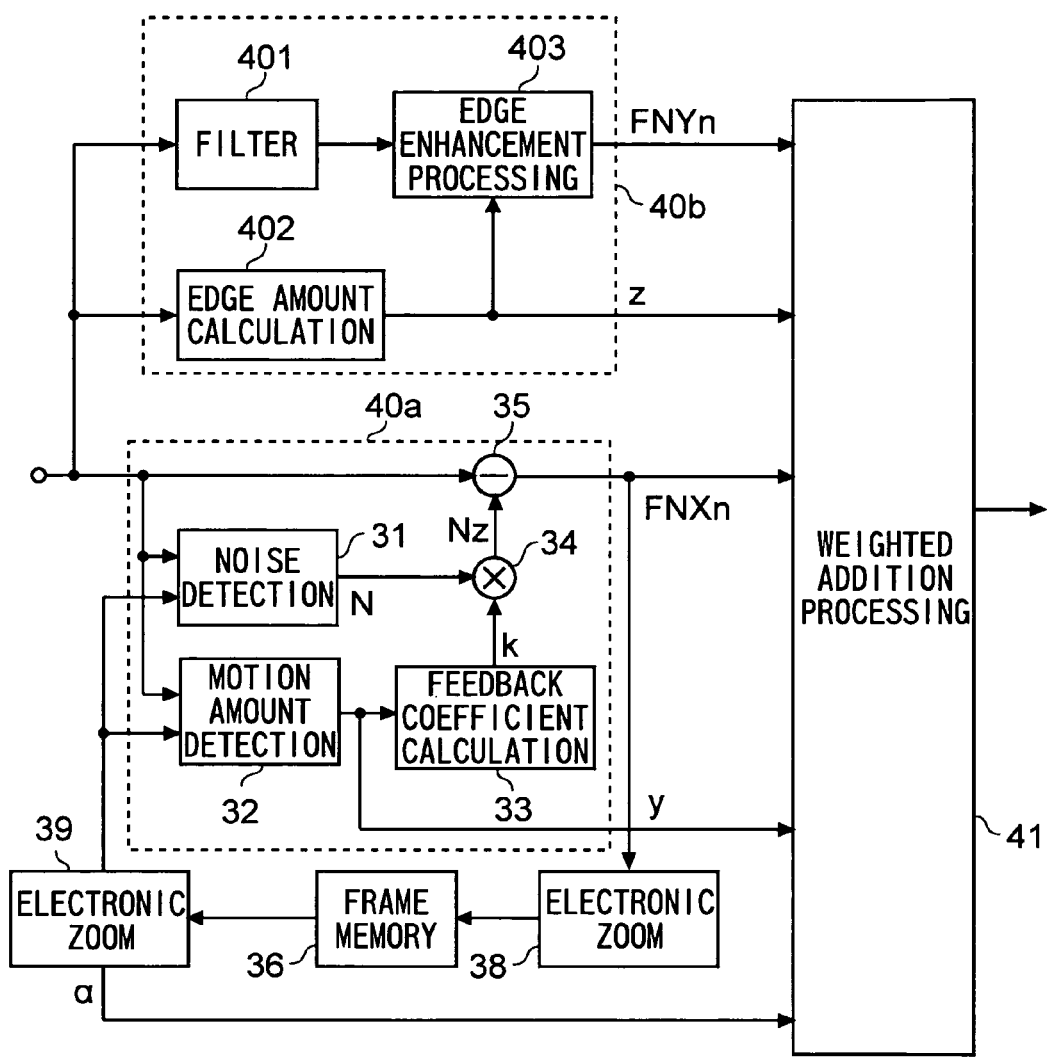
FIG. 21 is a block diagram showing another configuration of a noise reduction processing portion provided in an image processing portion in an image sensing apparatus according to the second embodiment of the invention.

In this embodiment, as in the first embodiment (see FIG. 5), it is also possible, as in the noise reduction processing portion 30b shown in FIG. 21, to provide an electronic zoom portion 38 at the input side of the frame memory 36 for the purpose of reducing the image signal after noise reduction outputted from the three-dimensional noise reduction processing portion 40a, and to provide an electronic zoom portion 39 at the output side of the frame memory 36 for the purpose of enlarging the image signal stored in the frame memory 36 and then outputting the result to the three-dimensional noise reduction processing portion 40a.

Specifically, when the image signal of a high-resolution image is inputted from outside, the three-dimensional noise reduction processing portion 40a and the two-dimensional noise reduction processing portion 40b perform three-dimensional noise reduction processing and two-dimensional noise reduction processing respectively on the image signal of the high-resolution image. The image signals outputted from the three-dimensional noise reduction processing portion 40a and the two-dimensional noise reduction processing portion 40b respectively are then outputted to the weighted addition processing portion 41.

Here, the image signal outputted from the three-dimensional noise reduction processing portion 40a is reduced by the electronic zoom portion 38 and then fed to the frame memory 36, where it is stored for use in three-dimensional noise reduction processing on the image signal of the next frame. The image signal of the preceding frame stored in the frame memory 36 is enlarged by the electronic zoom portion 39 and then fed to the three-dimensional noise reduction processing portion 40a, where three-dimensional noise reduction processing on the image signal of the current frame is performed.

In the second embodiment, the three-dimensional noise reduction processing portion 40a (see FIGS. 18 and 21) is configured similarly to the conventional three-dimensional noise reduction processing apparatus of FIG. 22; it may however be additionally provided with an edge amount detection portion 37, like the three-dimensional noise reduction processing portion 40 of the first embodiment show in FIG. 5.

In the embodiments described above, with the help of the electronic zoom portions 38 and 39, three-dimensional noise reduction processing is performed by use of a low-resolution image and a high-resolution image. By evaluating the magnitude of the edge amount, it is possible to change the different calculation processing (in the first embodiment, the calculation processing by the noise detection portion 31 and the feedback coefficient calculation portion 33; in the second embodiment, the calculation processing by the weighted addition processing portion 41) involved in three-dimensional noise reduction processing. This makes it possible to perform calculation processing with consideration given to the magnitude of the edge amount, and thereby to reduce the blurring occurring in an edge part as a result of resolution augmentation being performed after resolution diminution.

The present invention finds applications in image sensing apparatuses that perform three-dimensional noise reduction processing on an image signal, and thus finds applications in various image sensing apparatuses such as digital still cameras for shooting still images and digital video cameras for shooting moving images.

What is claimed is:

1. A noise reduction processing apparatus comprising:
  a three-dimensional noise reduction processing portion comprising:
    a noise detection portion that, by using image signals of a plurality of frames acquired at different times, detects, for each pixel, a noise amount in a first image signal taken as an input frame; and a calculation portion that performs noise reduction by subtracting the noise amount detected by the noise detection portion from the first image signal and outputs a resulting signal as a second image signal taken as an output frame;

a first electronic zoom portion that performs resolution diminution processing on the second image signal outputted from the three-dimensional noise reduction processing portion to generate and output a low-resolution image signal;

a frame memory that stores the low-resolution image signal, based on the second image signal, outputted from the first electronic zoom portion; and a second electronic zoom portion that performs resolution augmentation processing on the second image signal stored as the low-resolution image signal in the frame memory to output a resulting signal as the second image signal as acquired in the past to the three-dimensional noise reduction processing portion;

wherein the three-dimensional noise reduction processing portion performs three-dimensional noise reduction processing on the first image signal based on
the first image signal taken as the input frame and
the second image signal fed from the second electronic zoom portion.

2. The noise reduction processing apparatus according to claim 1, further comprising:
an edge calculation portion that calculates an edge amount with reference to which an edge part in the first image signal is evaluated,
wherein the calculation portion adjusts the noise amount in the first image signal based on magnitude of the edge amount calculated by the edge calculation portion, and subtracts a resulting amount from the first image signal.

3. The noise reduction processing apparatus according to claim 2,
wherein the three-dimensional noise reduction processing portion comprises a noise detection parameter calculation portion that calculates a parameter for a first calculation formula for decreasing the noise amount detected by the noise detection portion when the edge amount calculated by the edge calculation portion is large.

4. The noise reduction processing apparatus according to claim 2,
wherein the three-dimensional noise reduction processing portion comprises:
a motion amount detection portion that detects, for each pixel, a motion amount in the first image signal from the first and second image signals taken as a plurality of frames; and
a motion amount setting parameter calculation portion that calculates a parameter for a second calculation formula for increasing the motion amount detected by the motion amount detection portion when the edge amount calculated by the edge calculation portion is large.

5. The noise reduction processing apparatus according to claim 1, further comprising:
a two-dimensional noise reduction portion that detects a noise amount in a two-dimensional space in the first image signal inputted from outside the apparatus and reduces the noise amount; and
a weighted addition processing portion that acquires and outputs a noise-reduced image signal by performing weighted addition of
a third image signal subjected to noise reduction by the two-dimensional noise reduction and outputted the second image signal subjected to noise reduction by the three-dimensional noise reduction processing portion and outputted with a same resolution as the third image signal.

6. An image sensing apparatus comprising:
the noise reduction processing apparatus according to claim 1,
wherein
the noise reduction processing apparatus is fed with image signals of a plurality of frames-worth shot images, and
noise in the first image signal taken as the input frame is reduced based on image signals of a plurality of frames including the input frame.

7. A noise reduction processing apparatus comprising:
a three-dimensional noise reduction processing portion comprising:
a noise detection portion that, by using image signals of a plurality of frames acquired at different times, detects, for each pixel, a noise amount in a first image signal taken as an input frame; and
a calculation portion that performs noise reduction by subtracting the noise amount detected by the noise detection portion from the first image signal and outputs a resulting signal as a second image signal taken as an output frame;
a first electronic zoom portion that performs resolution diminution processing on the first image signal and outputs the first image signal as a low-resolution image signal to the three-dimensional noise reduction processing portion;
a frame memory that stores, intact as the low-resolution image signal, the second image signal outputted from the three-dimensional noise reduction processing portion and outputs the stored second image signal as the second image signal as acquired in the past to the three-dimensional noise reduction processing portion;
a second electronic zoom portion that performs resolution augmentation processing on the second image signal outputted as the low-resolution image signal from the three-dimensional noise reduction processing portion and outputs a resulting signal as an image signal of a current frame after noise reduction,
wherein the three-dimensional noise reduction processing portion performs three-dimensional noise reduction processing on the first image signal based on
the first image signal fed from the first electronic zoom portion and
the second image signal fed from the frame memory.

8. The noise reduction processing apparatus according to claim 7, further comprising:
an edge calculation portion that calculates an edge amount with reference to which an edge part in the first image signal is evaluated,
wherein the calculation portion adjusts the noise amount in the first image signal based on magnitude of the edge amount calculated by the edge calculation portion, and subtracts a resulting amount from the first image signal.

9. The noise reduction processing apparatus according to claim 8,
wherein the three-dimensional noise reduction processing portion comprises a noise detection parameter calculation portion that calculates a parameter for a first calculation formula for decreasing the noise amount detected by the noise detection portion when the edge amount calculated by the edge calculation portion is large.

10. The noise reduction processing apparatus according to claim 8, wherein the three-dimensional noise reduction processing portion comprises:
- a motion amount detection portion that detects, for each pixel, a motion amount in the first image signal from the first and second image signals taken as a plurality of frames; and
- a motion amount setting parameter calculation portion that calculates a parameter for a second calculation formula for increasing the motion amount detected by the motion amount detection portion when the edge amount calculated by the edge calculation portion is large.

11. The noise reduction processing apparatus according to claim 7, further comprising:
- a two-dimensional noise reduction portion that detects a noise amount in a two-dimensional space in the first image signal inputted from outside the apparatus and reduces the noise amount; and
- a weighted addition processing portion that acquires and outputs a noise-reduced image signal by performing weighted addition of
  - a third image signal subjected to noise reduction by the two-dimensional noise reduction and outputted
  - the second image signal subjected to noise reduction by the three-dimensional noise reduction processing portion and outputted with a same resolution as the third image signal.

12. An image sensing apparatus comprising:
the noise reduction processing apparatus according to claim 7,
wherein
the noise reduction processing apparatus is fed with image signals of a plurality of frames-worth shot images, and
noise in the first image signal taken as the input frame is reduced based on image signals of a plurality of frames including the input frame.

13. A noise reduction processing method comprising:
- a noise detection step of, by using image signals of a plurality of frames acquired at different times, detecting, for each pixel, a noise amount in a first image signal taken as an input frame;
- a calculation step of performing noise reduction by subtracting the noise amount detected in the noise detection step from the first image signal, and then outputting a resulting signal as a second image signal taken as an output frame;
- a resolution diminution step of performing resolution diminution processing on the second image signal obtained in the calculation step to generate and output a low-resolution image signal;
- a storage step of storing in a frame memory the low-resolution image signal, based on the second image signal, obtained in the resolution diminution step; and
- a resolution augmentation step of performing resolution augmentation processing on the second image signal stored as the low-resolution image signal in the frame memory, and then outputting a resulting signal as the second image signal as acquired in the past;
wherein, in the noise detection step and the calculation step, three-dimensional noise reduction processing is performed with the first and second image signals converted into image signals with a same resolution as the input frame.

14. A noise reduction processing method comprising:
- a noise detection step of, by using image signals of a plurality of frames acquired at different times, detecting, for each pixel, a noise amount in a first image signal taken as an input frame;
- a calculation step of performing noise reduction by subtracting the noise amount detected in the noise detection step from the first image signal, and then outputting a resulting signal as a second image signal taken as an output frame;
- a resolution diminution step of performing resolution diminution processing on the first image signal to convert the first image signal into a low-resolution image signal;
- a storage step of storing, in a frame memory, the second image signal obtained as the noise-reduced low-resolution image signal in the calculation step; and
- a resolution augmentation step of performing resolution augmentation processing on the second image signal obtained as the noise-reduced low-resolution image signal in the calculation step, and then outputting a resulting signal as an image signal with a same resolution as the input frame,
wherein, in the noise detection step and the calculation step, three-dimensional noise reduction processing is performed with the first and second image signals converted into low-resolution image signals.

* * * * *